US012607512B2

(12) United States Patent
Katori

(10) Patent No.: US 12,607,512 B2
(45) Date of Patent: Apr. 21, 2026

(54) ELECTRONIC STATE SPLITTER FOR ATOMS, ATOM INTERFEROMETER ATOMIC TRANSITION FREQUENCY MEASUREMENT DEVICE, ATOMIC OSCILLATOR, OPTICAL LATTICE CLOCK, QUANTUM COMPUTER AND METHOD FOR GENERATING SUPERPOSITION OF ELECTRONIC STATES OF ATOMS

(71) Applicant: THE UNIVERSITY OF TOKYO, Tokyo (JP)

(72) Inventor: Hidetoshi Katori, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 425 days.

(21) Appl. No.: 18/455,276

(22) Filed: Aug. 24, 2023

(65) Prior Publication Data

US 2024/0068872 A1 Feb. 29, 2024

Related U.S. Application Data

(63) Continuation of application No. PCT/JP2022/006110, filed on Feb. 16, 2022.
(Continued)

(30) Foreign Application Priority Data

Jul. 14, 2021 (JP) ................................. 2021-116217

(51) Int. Cl.
*G01J 3/45* (2006.01)
*G04F 5/14* (2006.01)

(52) U.S. Cl.
CPC . *G01J 3/45* (2013.01); *G04F 5/14* (2013.01)

(58) Field of Classification Search
CPC ..................................... G01J 3/45; G04F 5/14
See application file for complete search history.

(56) References Cited

U.S. PATENT DOCUMENTS 4,315,224 A 2/1982 Ezekiel et al.
5,274,231 A 12/1993 Chu et al.
(Continued)

FOREIGN PATENT DOCUMENTS

JP 2018510494 A 4/2018
JP 2018085719 A 5/2018
(Continued)

OTHER PUBLICATIONS

Bowden et al., "Improving the Q factor of an optical atomic clock using quantum non-demolition measurement", Oct. 21, 2020, 11 pages.
(Continued)

*Primary Examiner* — Sean M Luck
(74) *Attorney, Agent, or Firm* — CANTOR COLBURN LLP

(57) ABSTRACT

An electronic state splitter for atoms comprises an atom supplier, an atom movement path, a probe laser source, and a magnetic field generator. The atom supplier supplies atoms moving at a constant velocity along the atom movement path. The probe laser source supplies a probe laser propagating in the atom movement path in the same direction as or opposite to the motion of the atoms on the same axis as the atom movement path. The magnetic field generator generates a magnetic field orthogonal to the atom movement path in the atom movement path to mix the wave function of the clock upper state with the electronic state allowing electric dipole transitions, allowing pulsed excitation of clock transitions by the probe laser uniform in time and space. Accordingly, continuous spectroscopy of atomic tran-
(Continued)

§ sitions and frequency control of the probe laser are possible, which improves the stability of the atomic clock.

14 Claims, 22 Drawing Sheets

Related U.S. Application Data

(60) Provisional application No. 63/153,434, filed on Feb. 25, 2021.

(56) References Cited

U.S. PATENT DOCUMENTS

| | | | |
|---|---|---|---|
| 6,303,928 | B1 | 10/2001 | Buell et al. |
| 9,217,859 | B2 * | 12/2015 | Dillon ............... G01B 11/2527 |
| 2020/0357534 | A1 * | 11/2020 | Larsen ................... G01C 19/58 |
| 2021/0262798 | A1 * | 8/2021 | Kitching ............... G21K 1/067 |

FOREIGN PATENT DOCUMENTS

| | | |
|---|---|---|
| JP | 2020141401 A | 9/2020 |
| WO | 2014027637 A1 | 2/2014 |

OTHER PUBLICATIONS

Dorscher et al., "Dynamical decoupling of laser phase noise in compound atomic clocks", Communications Physics, 2020, 9 pages.
International Search Report for International Application No. PCT/JP2022/006110; Mailing Date, May 10, 2022.
Kishimoto et al., "Electrodynamic trapping of spinless neutral atoms with an atom chip", Oct. 1, 2018, 4 pages.
PCT International Preliminary Report on Patentability with Written Opinion of the International Searching Authority for International Application No. PCT/JP2022/006110; Date of Issuance: Aug. 29, 2023.
Riehle "Frequency Standards", Sections 5.3 , 6.0 and 7.0; 39 pages.
Santarelli et al., "Frequency Stability Degradation of an Oscillator Slaved to a Periodically Interrogated Atomic Resonator", IEEE Transactions on Ultrasonics, Ferroelectrics, and Frequency Control, vol. 45, No. 4, Jul. 1998, 8 pages.
Schioppo et al., "Ultra-stable optical clock with two cold-atom ensembles", 21 pages.
Taichenachev et al., "Magnetic field-induced spectroscopy of forbidden optical transitions with application to lattice-based optical atomic clocks", Aug. 31, 2018, 5 pages.
Takamoto et al., "Test of general relativity by a pair of transportable optical lattice clocks", Nature photonics, vol. 14, Jul. 2020, 7 pages.
M. Barbiero, et al. "Sideband-Enhanced Cold Atomic Source of Optical Clocks" APS Physical Review vol. 13, No. 1, Jan. 9, 2020, XP93247368, Retrieved from the Internet: DOI: https://doi.org/10.1103/PhysRevApplied.13.104013; 27 pages.
EPO Partial Supplemental European Search Report for corresponding EP Application No. 22759447.0; Issued Feb. 17, 2025.
Poli, et al. Rivista Del Nuovo Cimento "Optical Atomic Clocks", PACSTY Ion Trapping, Jan. 10, 2014, XP055667378, Retrieved from the Internet: URL:https://arXiv.org/pdf/1401.2378.pdf, 70 pages.
Olson, Judith et al: "Ramsey-Bord'e Matter-Wave Interferometry for Laser Frequency Stabilization at 10-16 Frequency Instability and Below" Physical Review Letters, vol. 123, No. 7, Aug. 1, 2019 (Aug. 1, 2019), XP093277279,US ISSN: 0031-9007, DOI: 10.1103/PhysRevLett.123.073202Retrieved from the Internet: URL:https://journals.aps.org/prl/abstract/ 10.1103/PhysRevLett.123.073202>.
Bin Wu et al: "The investigation of a u Gal-level cold atom gravimeter for field applications", Metrologia, Institute of Physics Publishing, Bristol, GB, vol. 51, No. 5, Jul. 21, 2014 (Jul. 21, 2014), pp. 452-458, XP020270941,ISSN: 0026-1394, DOI: 10.1088/0026-1394/51/5/452 [retrieved on Jul. 21, 2014].
EPO Extended European Search Report for corresponding EP Application 22759447.0; Issued Jun. 3, 2025.
Todd F. Sheerin, Frequency Stability in a Compact, Deployable Optical Atomic Clock, A.B. Physics, Jan. 1, 2019 (Jan. 1, 2019), pp. 1-298, XP093277269, Retrieved from the Internet: URL:https://hdl.handle.net/1721.1/139714.
Takamoto Masao et al: "Test of general 1-3,8-11 INV.relativity by a pair of transportable optical lattice clocks", Nature Photonics, Nature Publishing Group H01S3/00UK, London, vol. 14, No. 7, Apr. 6, 2020 (Apr. 6, 2020), pp. 411-415, XP037165348, H01J3/32ISSN: 1749-4885, DOI: 10.1038/S41566-020-0619-8 [retrieved on Apr. 6, 2020].

* cited by examiner

FIG. 15

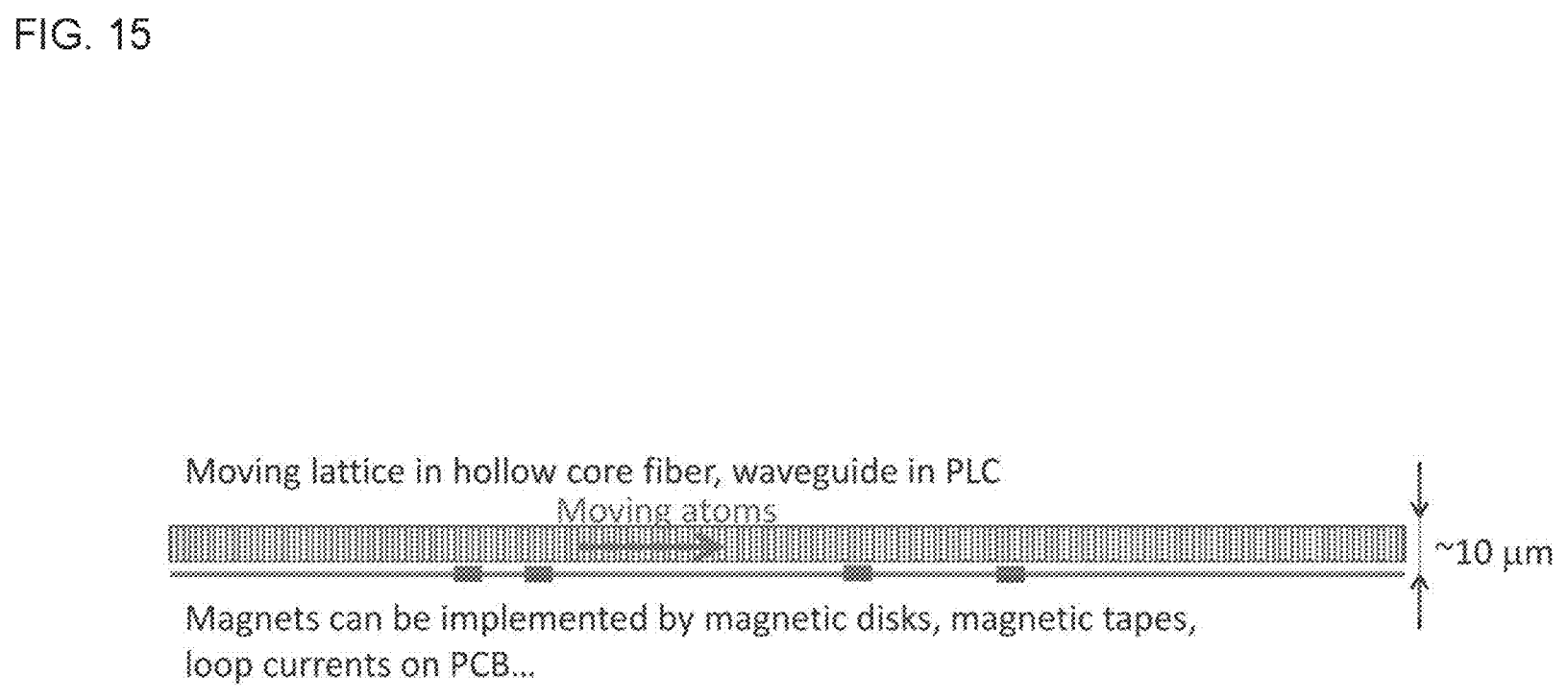

Moving lattice in hollow core fiber, waveguide in PLC

Moving atoms

~10 μm

Magnets can be implemented by magnetic disks, magnetic tapes, loop currents on PCB...

Lattice at rest in hollow core fiber, waveguide in PLC

Moving magnets

~10 μm

Moving magnets implemented by magnetic disks, magnetic tapes,...

ELECTRONIC STATE SPLITTER FOR ATOMS, ATOM INTERFEROMETER ATOMIC TRANSITION FREQUENCY MEASUREMENT DEVICE, ATOMIC OSCILLATOR, OPTICAL LATTICE CLOCK, QUANTUM COMPUTER AND METHOD FOR GENERATING SUPERPOSITION OF ELECTRONIC STATES OF ATOMS

CROSS REFERENCE TO RELATED APPLICATIONS

This application is a continuation under 35 U.S.C. § 120 of PCT/JP2022/006110, filed Feb. 16, 2022, which is incorporated herein by reference, and which claimed priority to Japanese Application No. 2021-116217, filed Jul. 14, 2021, and U.S. Provisional Application No. 63/153,434, filed Feb. 25, 2021. The present application likewise claims priority under 35 U.S.C. § 119 to Japanese Application No. 2021-116217, filed Jul. 14, 2021, and U.S. Provisional Application No. 63/153,434, filed Feb. 25, 2021, the entire contents of both applications are also incorporated herein by reference.

This application claims priority based on U.S. Provisional Patent Application No. 63/153,434 and Japanese Patent Application JP 2021-116217, which are incorporated by reference in its entirety.

TECHNICAL FIELD

The present invention relates to an electronic state splitter for atoms, an atom interferometer, an atomic transition frequency measurement device, an atomic oscillator, an optical lattice clock, a quantum computer, and a method for generating superposition of electronic states of atoms.

BACKGROUND ART

Rabi spectroscopy and Ramsey spectroscopy are known as methods for measuring atomic transition frequencies with high precision (see, for example, Non-Patent Literature 1). In this document, transitions of states of atoms, molecules, and ions are called "atomic transitions".

In these spectroscopic methods, atoms are excited by being irradiated with a pulse of coherent excitation light, probe light. The transition probability of an atom varies sensitively according to the frequency of the probe light. Therefore, by measuring the transition probability, an atomic transition frequency can be observed with high precision.

A "moving optical lattice", in which atoms are trapped near the lattice points of an optical lattice and carried along the atomic movement path, has also been proposed (see, for example, Patent Literature 1).

CITATION LIST

Patent Literature

[Patent Literature 1] WO 2014/027637 A

Non Patent Literature

[Non Patent Literature 1] F. Riehle, "Frequency standards: basics and applications" John Wiley & Sons (2006), ISBN: 978-3-527-60595-8
[Non Patent Literature 2] G. Santarelli, C. Audoin, A. Makdissi, P. Laurent, G. J. Dick, A. Clairon, Frequency stability degradation of an oscillator slaved to a periodically interrogated atomic resonator, IEEE Transactions on Ultrasonics, Ferroelectrics, and Frequency Control, 45 (1998) 887-894
[Non Patent Literature 3] A. V. Taichenachev, V. I. Yudin, C. W. Oates, C. W. Hoyt, Z. W. Barber, L. Hollberg, Magnetic Field-Induced Spectroscopy of Forbidden Optical Transitions with Application to Lattice-Based Optical Atomic Clocks, Physical Review Letters, 96 (2006) 083001
[Non Patent Literature 4] T. Kishimoto, H. Hachisu, J. Fujiki, K. Nagato, M. Yasuda, H. Katori, Electrodynamic trapping of spinless neutral atoms with an atom chip, Physical Review Letters, 96 (2006) 083001. Physical Review Letters, 96 (2006) 123001
[Non Patent Literature 5] M. Schioppo, R. C. Brown, W. F. McGrew, N. Hinkley, R. J. Fasano, K. Beloy, T. H. Yoon, G. Milani, D. Nicolodi, and J. Sherman, "Ultrastable optical clock with two cold-atom ensembles," Nat. Photon. 11, 48 (2017)
[Non Patent Literature 6] W. Bowden, A. Vianello, I. R. Hill, M. Schioppo, and R. Hobson, "Improving the Q factor of an optical atomic clock using quantum nondemolition measurement", Phys. Rev. X 10, 041052 (2020)
[Non Patent Literature 7] S. Dorscher, A. Al-Masoudi, M. Bober, R. Schwarz, R. Hobson, U. Sterr, and C. Lisdat, "Dynamical decoupling of laser phase noise in compound atomic clocks," Commun. Phys. 3, 1 (2020)
[Non Patent Literature 8] M. Takamoto, I. Ushijima, N. Ohmae, T. Yahagi, K. Kokado, H. Shinkai, and H. Katori, "Test of general relativity by a pair of transportable optical lattice clocks", Nature Photonics volume 14, pages 411-415 (2020)

SUMMARY OF INVENTION

Technical Problem

In Ramsey spectroscopy, an atom interacts with the excitation light twice. Then, the larger the temporal or spatial separation between the two interactions, the finer the spectroscopic resolution will be. However, the coherence of the excitation light deteriorates due to the mechanical stability of the mirrors that split and reflect the light if the excitation light is spatially separated. Therefore, the wider the spacing to increase spectroscopic resolution, the more the mechanical stability of the mirrors must be increased. In this case, it becomes difficult to maintain coherence. On the other hand, the problem of mechanical stability of the mirrors is relieved if the excitation light is separated temporally. However, it is necessary to temporally separate Ramsey spectroscopy and atomic state detection. In this case, the light cannot be phase-sensitively stabilized due to the lack of continuous frequency measurement. It is known that the time required to generate and capture cold atoms and to detect their states results in a stability limit, which is called the Dick limit (see, e.g., Non-Patent Document 2). Furthermore, the longer the interaction time between the atom and the laser beam for the purpose of increasing the spectroscopic resolution, the higher frequency stability is required for the laser frequency. The generation of such laser requires a stable optical resonator with a length of several 10 cm, which causes the equipment to become larger. Consequently, conventional spectroscopic techniques make it difficult to perform high-precision atomic transition frequency measurements with compact equipment.

A general purpose of this invention is to realize high-precision spectroscopic measurement using a compact device.

Solution to Problem

In order to solve the above problems, an electronic state splitter for atoms according to an embodiment of the invention comprises an atom supplier, an atom movement path, a probe laser source and a magnetic field generator. The atom supplier supplies atoms moving at a constant velocity along the atom movement path. The probe laser source provides in the atom movement path a probe laser that propagates on the same axis as the atom movement path in the same direction as or opposite to the motion of the atoms. The magnetic field generator generates in the atom movement path a magnetic field orthogonal to the atom movement path to cause mixing of the wavefunction with the dipole-allowed electronic state, thereby enabling excitation of the clock transitions by the probe laser.

According to this embodiment, excitation of arbitrary pulse area can be realized using a temporally and spatially uniform probe laser. Therefore, it is possible to realize an electronic state splitter for atoms, which can split the internal states of atoms into arbitrary superposition states. The electronic state splitter for atoms in this manner can be applied to various applications, such as atomic transition frequency measurement devices, atomic oscillators, optical lattice clocks, quantum computers, and so on.

In one embodiment, the electronic state splitter for atoms may comprise a first lattice laser source and a second lattice laser source. The first lattice laser source and the second lattice laser source supply a pair of optical lattice lasers that propagate in opposite directions each other along the atom movement path to form an optical lattice formed of standing waves. The pair of optical lattice lasers have the frequency of each optical lattice laser shifted with respect to each other. The optical lattices are moving optical lattices that move along the atom movement path. The moving optical lattices carry the atoms along said atomic movement path.

In one embodiment, each of the optical lattice lasers may be set to a magic frequency that does not cause a Stark shift of the clock transition.

In one embodiment, the magnetic field may be an AC magnetic field at the magic frequency (e.g., a magnetic field with the magnetic field component of the laser light tuned to the magic frequency).

Another embodiment of the invention is an atom interferometer. This atom interferometer comprises multiple electronic state splitters. Each of the electronic state splitters comprises an atom supplier, an atom movement path, a probe laser source, a first magnetic field generator and a second magnetic field generator. The atom supplier supplies atoms moving at a constant velocity along the atom movement path. The probe laser source provides in the atom movement path a probe laser that propagates on the same axis as the atom movement path in the same direction as or opposite to the motion of the atoms. The first magnetic field generator and the second magnetic field generator generate in the atom movement path a magnetic field orthogonal to the atom movement path to cause mixing of the wavefunction with the dipole-allowed electronic state, thereby enabling excitation of the clock transitions by the probe laser.

According to this embodiment, a compact and highly precise atom interferometer can be realized.

In one embodiment, the atom interferometer may comprise a detection laser source that provides a detection laser for projective measurement of the electronic state of the atom after electronic state operation by the electronic state splitter. The first magnetic field generator and the second magnetic field generator may be spaced apart by a distance corresponding to the interaction length between the atom and the probe laser. The first magnetic field generator and the second magnetic field generator each causes excitation with a $\pi/2$ pulse area of on the atom by combining the magnetic field and the probe laser to achieve Ramsey spectroscopy.

In one embodiment, the first magnetic field generator and the second magnetic field generator may be arranged adjacent to each other without any spacing. In this case, the first magnetic field generator, the second magnetic field generator and the probe laser each gives pulses with a $\pi/2$ pulse area to the atoms, so that the whole pulse area is $\pi$ and Rabi spectroscopy is realized.

Yet another embodiment of the invention is an atomic transition frequency measurement device. This atomic transition frequency measurement device comprises an atom supplier, an atom movement path, a probe laser source, a first magnetic field generator, a second magnetic field generator, a detection laser source and a detector. The atom supplier supplies atoms moving at a constant velocity along the atom movement path. The probe laser source provides in the atom movement path a probe laser that propagates on the same axis as the atom movement path in the same direction as or opposite to the motion of the atoms. the first magnetic field generator and the second magnetic field generator generate in the atom movement path a magnetic field orthogonal to the atom movement path to cause mixing of the wavefunction with the dipole-allowed electronic state, thereby enabling excitation of the clock transitions by the probe laser. In the presence of the first magnetic field and the second magnetic field, the prove laser causes excitation with a $\pi/2$ pulse area at each magnetic field to perform Ramsey spectroscopy. The first magnetic field generator and the second magnetic field generator are spaced apart by a distance corresponding to the interaction length of the atom and the probe laser. The detection laser source provides a detection laser for projective measurement of the electronic state of the atom after being irradiated with a pulse. The detector measures a signal proportional to the population of the electronic states of the atom.

According to this embodiment, a compact and highly accurate atomic transition frequency measurement device can be realized.

In one embodiment, the atomic transition frequency measurement device may comprise a magnetic field generator for measuring a Rabi spectrum at the front or rear stage of the first magnetic field generator and the second magnetic field generator. The distance between the first magnetic field generator and the second magnetic field generator is longer than the interaction length of the magnetic field generator for measuring a Rabi spectrum.

In one embodiment, the atomic transition frequency measurement device may comprise multiple pairs of magnetic field generators of different lengths from each other.

In one embodiment, the atomic transition frequency measurement device may comprise multiple pairs of magnetic field generators of different lengths. In one embodiment, the atomic transition frequency measurement device may comprise a magnetic field generator for measuring a Rabi spectrum at the front or rear stage of the first magnetic field generator and the second magnetic field generator. The distance between the first magnetic field generator and the second magnetic field generator is longer than the interaction length of the magnetic field generator for measuring a Rabi spectrum.

In one embodiment, the atom movement path may be a waveguide of hollow core fiber.

In one embodiment, atoms may be carried along the atom movement path by a moving optical lattice.

In one embodiment, the optical lattice trapping the atoms may be fixed in the atom movement path. In this case, the magnetic field generated by a pair of magnetic field generators moves the atoms along the atom movement path.

Yet another embodiment of the invention is an optical lattice clock and an atomic oscillator. These optical lattice clock and atomic oscillator comprise the aforementioned electronic state splitter for atoms, an atom state detector and a frequency control circuit according to its output.

In one embodiment, the optical lattice clock and atomic oscillator may comprise a Doppler shift compensator. This Doppler shift compensator comprises a ring resonator, a beat frequency detector, a first DDS (Direct Digital Synthesizer), a second DDS, a third DDS, a first optical frequency modulator, a second optical frequency modulator, and a third optical frequency modulator.

According to this embodiment, a compact and highly precise optical lattice clock and an atomic oscillator can be realized.

Yet another embodiment of the invention is a quantum computer. This quantum computer comprises the aforementioned electronic state splitter for atoms.

According to this embodiment, a compact and large-scale quantum computer can be realized.

Yet another embodiment of the invention is a method for generating a superposition state of electronic states of atoms using an electronic state splitter for atoms. The electronic state splitter for atoms comprises an atom supplier, an atom movement path, a probe laser source and a magnetic field generator. The method comprises supplying atoms moving at a constant velocity along the atom movement path using the atom supplier, providing in the atom movement path a probe laser that propagates on the same axis as the atom movement path in the same direction as or opposite to the motion of the atoms using the probe laser source and generating in the atom movement path a magnetic field orthogonal to the atom movement path to cause mixing of the wavefunction with the dipole-allowed electronic state, thereby enabling excitation of the clock transitions by the probe laser using the magnetic field generator.

According to this embodiment, excitation of arbitrary pulse area can be realized using a temporally and spatially uniform probe laser. Therefore, it is possible to realize an electronic state splitter for atoms, which can split the internal states of atoms into arbitrary superposition states. The electronic state splitter for atoms in this manner can be applied to various applications, such as atomic transition frequency measurement devices, atomic oscillators, optical lattice clocks, quantum computers, and so on.

Yet another embodiment of the invention is an electronic state splitter for atoms with nonzero total angular momentum ($F \neq 0$). This electronic state splitter for atoms comprises an atom supplier, an atom movement path, a probe laser source, a magnetic field source and a magnetic shield. The atom supplier supplies atoms moving at a constant velocity along the atom movement path. The magnetic shield surrounds the atom movement path and reduce the magnetic field generated by the magnetic field source at a shield position of the surrounded portion. The probe laser source excites the atom at the shield position by providing in the atom movement path a probe laser that resonates with the Zeeman-shifted atomic transitions at the shield position.

According to this embodiment, the electronic state splitter for atoms has the following effect.

The excitation can be controlled by a first-order Zeeman shift.

Compensation of the first-order Zeeman shift is possible by measuring the Zeeman shift $\pm f$ corresponding to the positive and negative magnetic sublevels ($\pm m$ states) and taking the average of them.

The magnetic field can be estimated from the first-order Zeeman shift, and the result can be used to compensate for the second-order Zeeman shift.

This eliminates the need for calibration of the magnetic field and drive power supply.

The second-order Zeeman shift and optical lattice light shift can be reduced to about $1/1000$ compared to the magnetic field-induced method.

Yet another embodiment of the invention is an atom interferometer. This atom interferometer comprises multiple electronic state splitters for atoms with non-zero total angular momentum ($F \neq 0$). That is, this atom interferometer comprises an atom supplier, an atom movement path, a probe laser source, a magnetic field source a first magnetic shield and a second magnetic shield. The atom supplier supplies atoms moving at a constant velocity along the atom movement path. The first magnetic shield and the second magnetic shield surround the atom movement path and reduce the magnetic field generated by the magnetic field source at a first shield position and a second shield position of the surrounded portion respectively. The probe laser source excites the atom at the shield position by providing in the atom movement path a probe laser that resonates with the Zeeman-shifted atomic transitions at the first shield position and the second shield position.

According to this embodiment, in an atom interferometer, this atom interferometer has the following effect.

The excitation can be controlled by a first-order Zeeman shift.

Compensation of the first-order Zeeman shift is possible by measuring the Zeeman shift $\pm f$ corresponding to the positive and negative magnetic sublevels ($\pm m$ states) and taking the average of them.

The magnetic field can be estimated from the first-order Zeeman shift, and the result can be used to compensate for the second-order Zeeman shift.

This eliminates the need for calibration of the magnetic field and drive power supply.

The second-order Zeeman shift and optical lattice light shift can be reduced to about $1/1000$ compared to the magnetic field-induced method.

Another embodiment of the invention is an atomic transition frequency measurement device. This atomic transition frequency measurement device comprises an atom supplier, an atom movement path, a probe laser source, a magnetic field source, a first magnetic shield, a second magnetic shield, a detection laser source and a detector. The atom supplier supplies atoms moving at a constant velocity along the atom movement path. The first magnetic shield and the second magnetic shield surround the atom movement path and reduce the magnetic field generated by the magnetic field source at a first shield position and a second shield position of the surrounded portion respectively. The probe laser source excites the atom at the shield position by providing in the atom movement path a probe laser that resonates with the Zeeman-shifted atomic transitions at the first shield position and the second shield position. The first magnetic shield and the second magnetic shield each causes excitation with a π/2 pulse area of on the atom by combining the magnetic field and the probe laser to achieve Ramsey spectroscopy. The detection laser source provides a detection laser for projective measurement of the electronic state of the atom after being irradiated with a pulse. The detector measures a signal proportional to the population of the electronic states of the atom.

According to this embodiment, in Ramsey spectroscopy, atomic transition frequency measurement device has the following effect.

The excitation can be controlled by the first-order Zeeman shift.

Compensation of the first-order Zeeman shift is possible by measuring the Zeeman shift ±f corresponding to the positive and negative magnetic sublevels (±m states) and taking the average of them.

The magnetic field can be estimated from the first-order Zeeman shift, and the result can be used to compensate for the second-order Zeeman shift.

This eliminates the need for calibration of the magnetic field and drive power supply.

The second-order Zeeman shift and optical lattice light shift can be reduced to about $\frac{1}{1000}$ compared to the magnetic field-induced method.

Any combination of the above components and the expression of the invention converted among devices, methods, systems, recording media, computer programs, etc. are also valid as a form of the invention.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 15 is a schematic diagram of the atom movement path of the atomic transition frequency measurement device according to the ninth embodiment;

DESCRIPTION OF EMBODIMENTS

The invention will now be described by reference to the preferred embodiments. This does not intend to limit the scope of the present invention, but to This does not intend to limit the scope of the present invention, but to exemplify the invention.

The invention will now be described with reference to the drawings based on suitable embodiments. The embodiments are examples rather than limitations of the invention, and all features or combinations of features described in the embodiments are not necessarily essential to the invention. Identical or equivalent components, parts, and processes shown in each drawing shall be given the same symbol, and duplicate explanations will be omitted where appropriate. The scale and shape of each part shown in each drawing are set for convenience in order to facilitate explanation and are not to be construed as limiting unless otherwise noted. Terms such as "first," "second," etc. used in this specification or in the claims do not indicate any order or degree of importance but are intended only to distinguish one configuration from another, unless otherwise mentioned. In addition, in each drawing, some parts of the components that are not important in explaining the form of the product are omitted.

Figure 1:
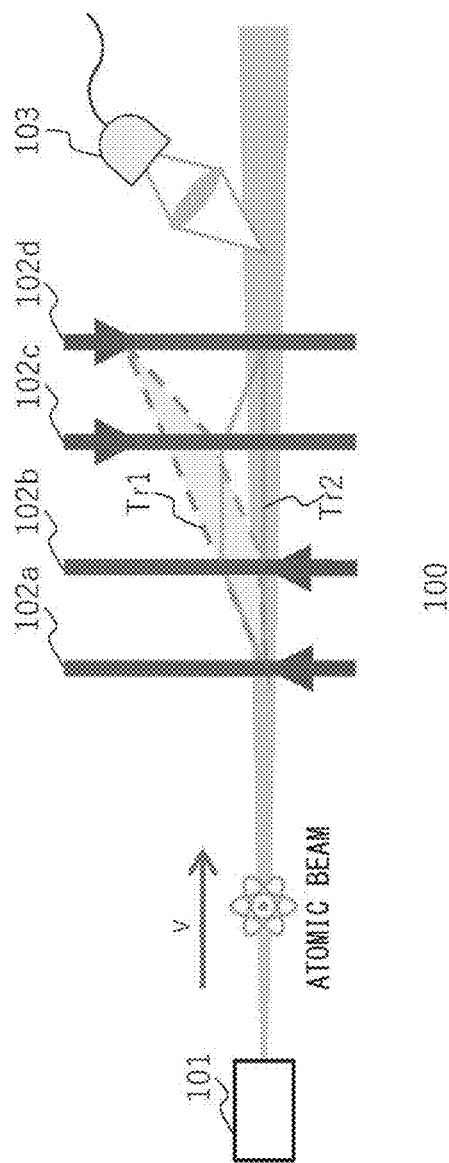
FIG. 1 is a schematic diagram of an apparatus for measuring atomic transition frequencies by Ramsey spectroscopy with a conventional method.

Before describing the specific form of implementation, the basic findings are described. FIG. 1 is a schematic diagram of an atomic transition frequency measurement device 100 using Ramsey spectroscopy, a related method. The atomic transition frequency measurement device 100 comprises an oven 101 for heating atoms, four parallel probe lasers 102a, 102b, 102c, and 102d, and a detector 103. The atomic beam heated by the oven 101 moves with a velocity v in the right direction on the paper. The probe lasers 102a and 102b are oriented upward on the paper surface, and the probe lasers 102c and 102d are oriented downward on the paper surface, both of which are orthogonal to the direction of motion of the atoms. The atoms in the ground state interact with the probe laser 102a and transition to a super-position of the ground and excited states. In the transition to the excited state, the orbital of the atom is also split into two as a result of the momentum imparted by the probe photon. Similar transitions of electronic and kinetic states occur in the probe lasers 102b-102c, resulting in the formation of two closed atomic orbitals Tr1 and Tr2 (shown as two trapezoids in FIG. 1). These constitute independent interferometers. This interferometer can be used to measure the frequency of the atomic transitions. The longer the interaction time between the atom and the probe laser, the more accurate the measurement, but the mechanical stability of the probe laser irradiation is compromised. As a result, the measurement precision deteriorates. In other words, the more one tries to increase measurement precision, the more difficult it is to mechanically control the phase between the four probe lasers, which is a trade-off. This limits the improvement of measurement precision. Furthermore, rotational acceleration due to the Sagnac effect is detected because the interferometer encloses a finite area if such interferometers are used in atomic clocks. This causes noise for atom interferometer s.

First Embodiment

Figure 2:
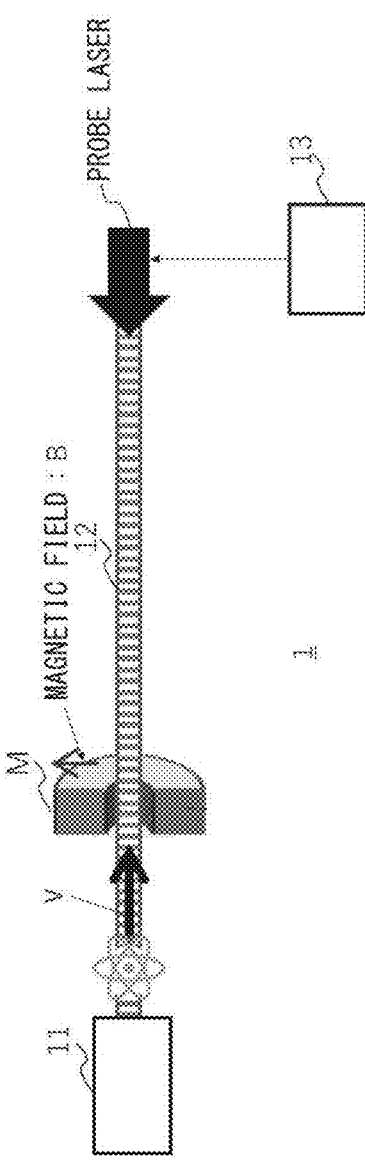
FIG. 2 is a schematic diagram of the electronic state splitter for atoms according to the first embodiment.

FIG. 2 is a schematic diagram of the electronic state splitter 1 for atoms according to the first embodiment. The electron state splitter 1 for atoms comprises an atom supplier 11, an atom movement path 12, a probe laser source 13 and a magnetic field generator M.

The atom supplier 11 has an atom supply source and a laser source for laser cooling. The atom supply source supplies atoms (e.g., $^{88}$Sr) that move at a constant velocity along the atom movement path 12. Specifically, the atoms are cooled by interacting with the laser source for laser cooling in the atom supply source 11 before being sent to the atom movement path 12. The atoms move at a constant velocity v along the atom movement path 12.

The atom movement path 12 serves as a guide for the atoms to move. The atom movement path 12 can be formed using, for example, a traveling standing wave in free space, a traveling standing wave in an optical resonator, or a traveling standing wave in an optical waveguide. The optical lattice lasers that make up these standing waves may be set to a magic frequency that does not cause a Stark shift in the clock transition. Alternatively, atomic guides may be formed by two-dimensional magnetic field traps and two-dimensional electric field traps (see, for example, Non Patent Literature 4).

The probe laser source 13 provides in the atom movement path 12 a probe laser that propagates, coaxially with the atom movement path 12, in the opposite or same direction as the motion of the atoms concerned. In other words, the direction of propagation of the probe laser is parallel or anti-parallel to the direction of motion of the atoms. FIG. 2 shows, as an example, a probe laser that propagates in the opposite direction of the motion of the atoms (i.e., anti-parallel to the direction of the motion of the atoms).

The magnetic field generator M is arranged around the atom movement path 12. The magnetic field generator M generates a magnetic field B in the atom movement path 12 that is orthogonal to the atom movement path 12 and parallel to the probe laser electric field. Atoms moving at a constant velocity v along the atom movement path 12 become dipole-allowed at the magnetic field generator M. This allows the probe laser, uniformly irradiated on the coaxial surface of the atom movement path 12, to give an arbitrary pulse area to the atom.

The magnetic field generator M can be formed using, for example, a permanent magnet, an electromagnet or a com-bination thereof.

The Rabi frequency $\Omega_B$ is expressed as follows $$\Omega_B = 2\pi\alpha\sqrt{I_p}|B| \tag{1}$$

where the parameter a is called the coupling coefficient if the intensity of the probe laser is $I_p$ and the magnitude of the magnetic field B parallel to the probe laser electric field is given. Assuming that the polarization of the probe laser and the magnetic field B are parallel, the coupling coefficient $\alpha$ for strontium atoms is $\alpha=198$ Hz/$(\sqrt{(mW/cm^2)})$ (see, for example, Non Patent Litera-ture 3).

Suppose an atom in state 1 (ground state) is irradiated with a resonant probe light for a time t. Then, the probabili-ties $P_1(t)$ and $P_2(t)$ of the atom being found in state 1 and state 2 (excited state), respectively, are calculated using the pulse area $\Omega_B$·t as $$P_1(t) = |a_1|^2 = \tfrac{1}{2}(1 + \cos \Omega_B \cdot t) \tag{2}$$

$$P_2(t) = |a_2|^2 = \tfrac{1}{2}(1 - \cos \Omega_B \cdot t) \tag{3}$$

where $a_1$ and $a_2$ are the probability amplitudes of state 1 and state 2, respectively.

Thus, atoms moving at a constant velocity v along the atom movement path 12 become a quantum mechanical superposition state at the point of the magnetic field gen-erator M. In other words, this apparatus functions as a state splitter that splits the internal states of atoms into quantum mechanical superposition states. Furthermore, this device can arbitrarily change the pulse area $\Omega_B$·t shown in equations (2) and (3), depending on the atom movement velocity v, the excited light intensity $I_P$, and the magnetic field shape.

According to this embodiment, excitation of arbitrary pulse area can be realized using a temporally and spatially uniform probe laser. Therefore, it is possible to realize an electronic state splitter for atoms, which can branch the internal states of atoms into arbitrary superposition states. The electronic state splitter for atoms in this manner can be applied to various applications, such as atomic transition frequency measurement devices, atomic oscillators, optical lattice clocks, quantum computers, and so on.

In the conventional method of Ramsey spectroscopy shown in FIG. 1, the direction of propagation of the probe laser is orthogonal to the direction of motion of the atoms. This causes the atoms to be "transversely excited". As explained above, in such cases, it was necessary to provide multiple probe lasers with a fixed instrumental phase rela-tionship. In contrast, in the present system, the direction of propagation of the probe lasers and the direction of motion of the atoms are coaxial. As a result, the atoms are "longi-tudinally excited. Thus, the present method has the remark-able feature that a single probe laser can cover the entire atomic beam area because the atoms are longitudinally excited. Therefore, the mechanical stability to establish the phase relationship between multiple probe lasers, as in the conventional method, is not necessary.

Second Embodiment

Figure 3:
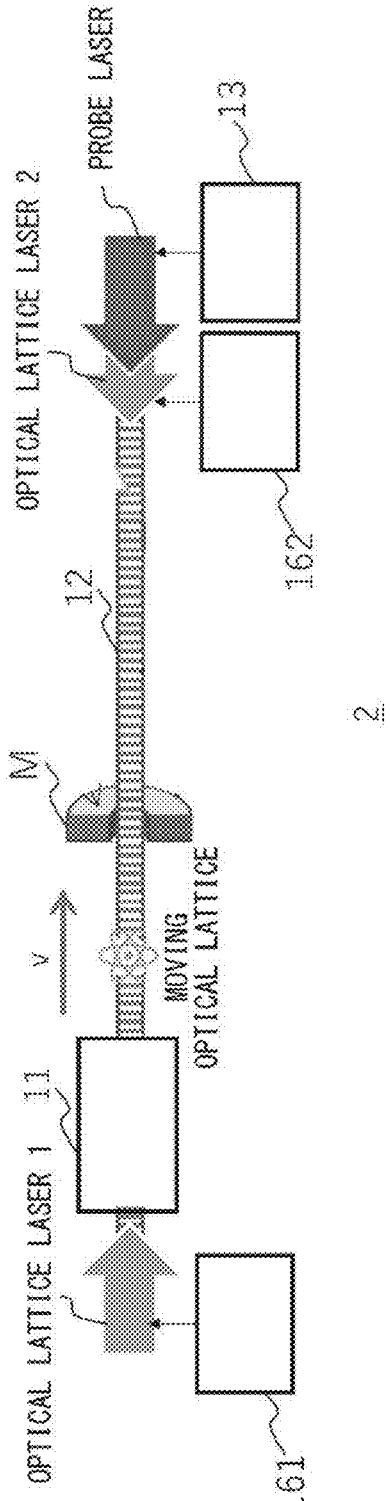
FIG. 3 is a schematic diagram of the electronic state splitter for atoms according to the second embodiment.

FIG. 3 shows a schematic diagram of the electronic state splitter 2 for atoms according to the second embodiment. The electronic state splitter 2 for atoms comprises an atom supplier 11, an atom movement path 12, a probe laser source 13, a magnetic field generator M, a first optical lattice laser source 161 and a second optical lattice laser source 162. In other words, the electron state splitter 2 for atoms comprises a first lattice laser source 161 and a second lattice laser source 162, in addition to the configuration of the electron state splitter 1 for atoms shown in FIG. 2. The other configurations of the electron state splitter 2 for atoms are common to those of the electron state splitter 1 for atoms.

The first optical lattice laser source 161 and the second optical lattice laser source 162 form an optical lattice formed of standing waves in the atom movement path 12 by providing pairs of optical lattice lasers, optical lattice laser 1 and optical lattice laser 2, that travel in opposite directions. The frequency of the optical lattice lasers may be set to a frequency that deviates from the magic frequency by a Doppler shift.

The frequencies of the optical lattice laser 1 and the optical lattice laser 2 are shifted from each other. As a result, the optical lattice formed is a moving optical lattice that moves along the atomic movement path 12. This moving optical lattice carries the aforementioned atoms at a constant velocity along the atomic movement path 12.

According to this embodiment, by confining the atoms to the moving optical lattice, said atoms can be carried at a constant velocity v. The atom-laser interaction time T is given by $1_R/v$ if the interaction length is $1_R$. The precision of frequency measurement improves in proportion to the −1 power of the interaction time T.

In this case, each optical lattice laser may be set to a magic frequency that does not cause a Stark shift of the clock transition.

A further effect of this embodiment is that the Doppler effect disappears because the atoms are confined to the Lamb Dicke region. This means that two excitation points are sufficient, eliminating the need for three or more excitation points as in conventional Ramsey spectroscopy in optical region.

A further effect of the above embodiment using a moving optical lattice is that shielding from external fields (blackbody radiation, electric fields, magnetic fields, etc.) can be more complete, since no aperture is needed to admit the probe from the lateral direction.

Third Embodiment

Figure 4:
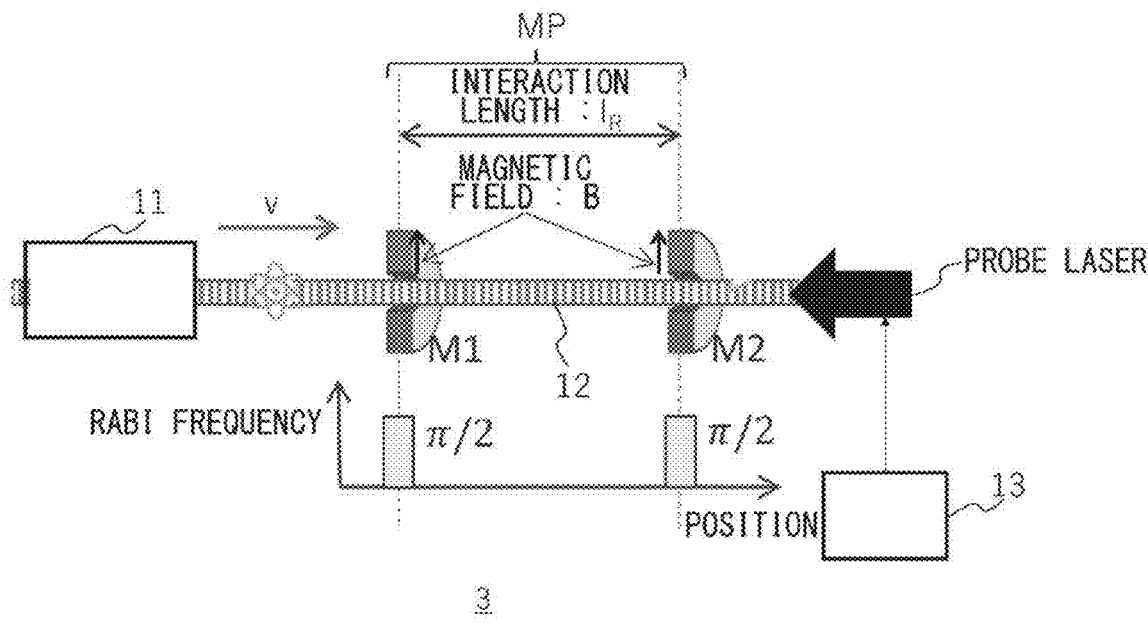
FIG. 4 is a schematic diagram of an atom interferometer according to the third embodiment.

FIG. 4 shows a schematic diagram of the atom interferometer 3 according to the third embodiment. This atom interferometer 3 performs splitting (branching) and combining (combining) of the electronic states of atoms by combining multiple atomic electronic state splitters of the aforementioned embodiment. Specifically, the atom interferometer 3 comprises an atom supplier 11, an atom movement path 12, a probe laser source 13, a first magnetic field generator M1 and a second magnetic field generator M2. The pair of the first magnetic field generator M1 and the second magnetic field generator M2 is written as MP. The atom interferometer 3 differs in that it has two magnetic field generators (i.e., the first magnetic field generator M1 and the second magnetic field generator M2), whereas the atomic electronic state splitter 1 in FIG. 2 has one magnetic field generator M.

According to this embodiment, a compact and highly precise atom interferometer can be realized.

The first magnetic field generator M1 and the second magnetic field generator M2 are spaced $1_R$ apart from each other. $1_R$ gives the interaction length between the atom and the probe laser. The first magnetic field generator M1 and the second magnetic field generator M2 generate a magnetic field B in the atom movement path 12 that is orthogonal to the atom movement path 12 and parallel to the electric field of the probe laser. Atoms moving at a constant velocity v along the atom movement path 12 are dipole-allowed at the position of the first magnetic field generator M1 and the second magnetic field generator M2. The pulse area $\Omega_B \cdot t$ in the first magnetic field generator M1 and the second magnetic field generator M2 may be given arbitrarily. In particular, in this example, this pulse area is π/2.

Forth Embodiment

In the atom interferometer 3 of FIG. 4, the first magnetic field generator M1 and the second magnetic field generator M2 are spaced $1_R$ apart from each other. However, this is not essential, but the first magnetic field generator M1 and the second magnetic field generator M2 may be arranged adjacent to each other without spacing. Also in this case, the pulse area $\Omega_B \cdot t$ in the first magnetic field generator M1 and the second magnetic field generator M2 may be given arbitrarily. In particular, in this example this pulse area is π/2, as in the second embodiment. Also in this case, the probe laser gives the atom a π/2 pulse in the first magnetic field generator M1 and the second magnetic field generator M2. As a result, the atom is continuously irradiated with π/2 pulses at substantially one location without any time interval. This corresponds to the atoms being irradiated with one π pulse. Consequently, this embodiment allows Rabi spectroscopy to be realized.

Fifth Embodiment

Figure 5:
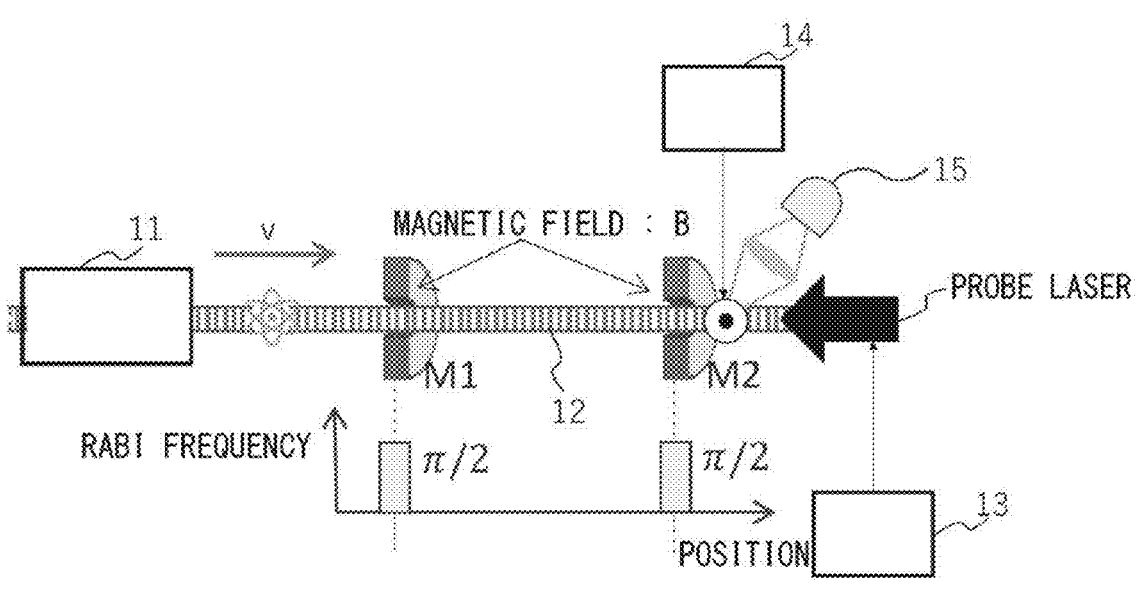
FIG. 5: Schematic diagram of an atomic transition frequency measurement device according to the fifth embodiment.

FIG. 5 is a schematic diagram of the atomic transition frequency measurement device 4 according to the fifth embodiment. The atomic transition frequency measurement device 4 comprises an atomic supply section 11, an atomic transfer path 12, a probe laser source 13, a first magnetic field generator M1, a second magnetic field generator M2, a detection laser source 14 and a detector 15. In other words, the atomic transition frequency measurement device 4 has a detection laser source 14 and a detector 15 in addition to the configuration of the atom interferometer 3 in FIG. 3. The other configurations of the atomic transition frequency measurement device 4 are the same as those of the atom inter-ferometer 3.

The detection laser source 14 provides a detection laser for projective measurement of the electronic state of an atom after being irradiated with a pulse. The direction of propagation of this detection laser is orthogonal to the atomic movement path 12 (in the example of FIG. 5, the detection laser is assumed to propagate from the back of the paper to the front).

The detector 15 measures the population of excited state of atoms resulting from the interference of the probability amplitudes of atomic transitions in the first magnetic field generator M1 and the second magnetic field generator M2.

Figure 6:
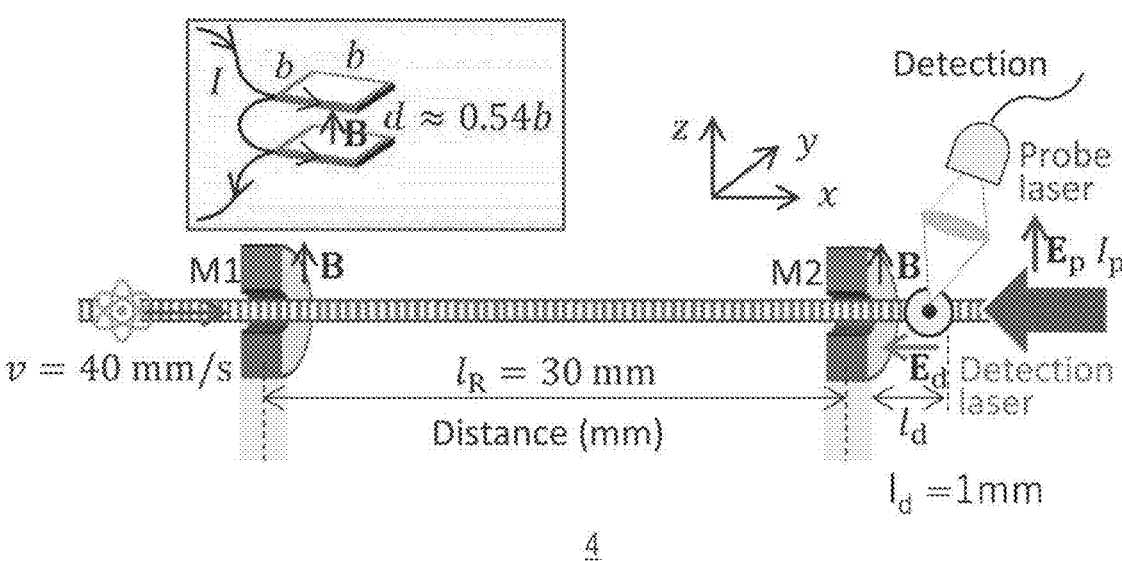
FIG. 6 is an enlarged view of a part of the atomic transition frequency measurement device of FIG. 5.

The atomic transition frequency measurement using the atomic transition frequency measurement system 4 is described below based on the forbidden transition $^1S_0 - ^3P_0$ of $^{88}Sr$. FIG. 6 is an enlarged view of a portion (in the vicinity of the first magnetic field generator M1 and the second magnetic field generator M2) of the atomic transition frequency measurement device 4 in FIG. 5. Atom supplier 11 supplies atoms, $^{88}$Sr, in this example. The distance $1_R$ between the first magnetic field generator M1 and second magnetic field generator M2 is 30 mm. The atoms move at a velocity v=40 mm/s in the right direction (x direction) of the paper. The magnitude (magnetic flux density) of the magnetic field B generated by the first magnetic field generator M1 and the second magnetic field generator M2 is 1 mT. Here, the first magnetic field generator M1 and the second magnetic field generator M2 may each consist of two substantially square-shaped coils. The length of one side of each coils b=2 mm and the spacing between the two coils d=0.54·b≈1.1 mm. The optical lattice laser 1 and the optical lattice laser 2 have a diameter of 2·$w_0$=320 μm and a Rayleigh length=100 mm.

Figure 7:
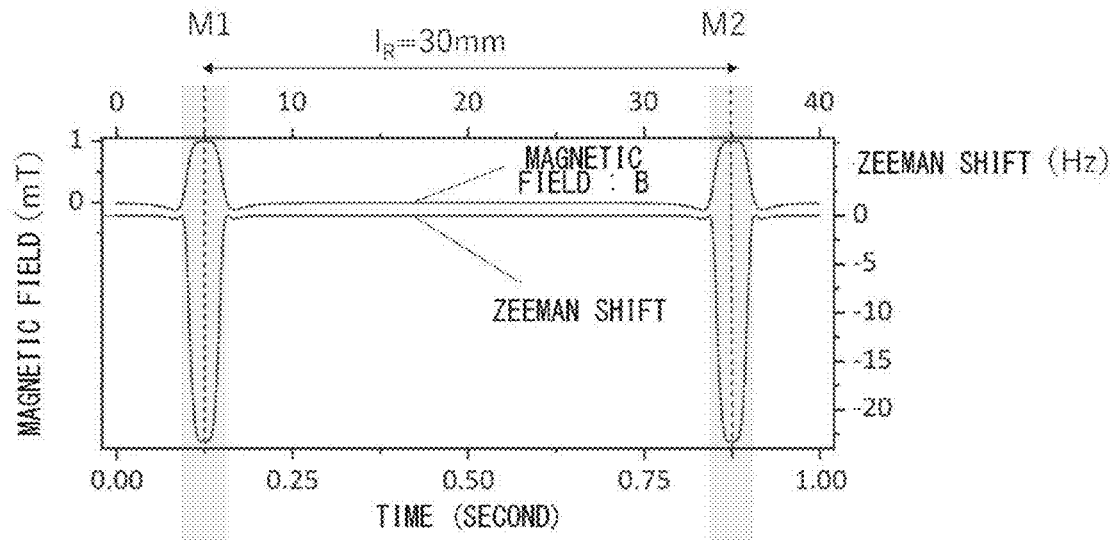
FIG. 7 is a graph showing the distribution of the magnetic field B in the x direction and the second-order Zeeman shift in the configuration of FIG. 6.

FIG. 7 shows the distribution of the magnetic field B in the x direction and the second-order Zeeman shift in the configuration of FIG. 6. It can be seen that the magnetic field B exist substantially only in the vicinity of the first magnetic field generator M1 and the second magnetic field generator M2. The magnetic field B gives a π/2 pulse with respect to the probe laser with intensity $I_P$=900 mW/cm$^2$. The second-order Zeeman shift $\Delta_B$(t) varies spatially in correspondence with the magnetic field B and has a maximum value of –23.3 Hz.

Figure 8:
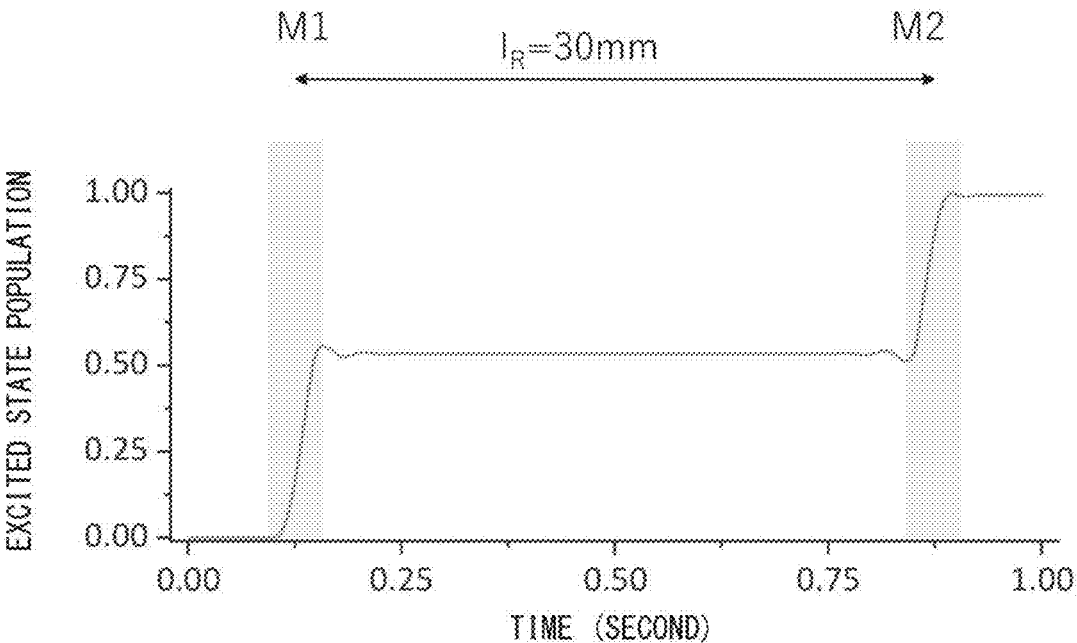
FIG. 8 is a graph showing the time variation of the population of the excited states of the atom in the configuration shown in FIG. 6.

FIG. 8 shows the time variation of the population of excited state of atoms in the configuration of FIG. 6. However, the probe detuning AP from the resonance frequency of the atom is –21.3 Hz. In the atom trapped in the moving optical lattice, the ground state and the excited state of the electronic states are superposed, by the π/2 pulse in the first magnetic field generator M1. After a time of $T_R$=$1_R$/v=750 ms, the atom reaches the second magnetic field generator M2. The π/2 pulse here causes the population of excited states to be substantially 100%. This corresponds to Ramsey interference when the probe laser frequency is in resonance with the Zeeman-shifted electronic state. The superposition of quantum states by π/2 pulses can also be used, for example, as an Hadamard gate in a quantum computer.

As shown in FIG. 6, we suppose that the diameter of the detection laser is 1 mm and the distance $1_d$ between the second magnetic field generator M2 and the detection laser is 1 mm. Then, the optical detection efficiency of the detector 15 is 10%. As a result, more than 10 photons can be observed per atom, so the number of atoms can be observed in the shot noise limit if the $^1S_0$–$^3P_1$ transition is excited and fluorescence is observed. On the other hand, the $^1S_0$–$^3P_1$ transition of an atom in the M2 region is non-resonant with the detected light because of its large Zeeman shift relative to its natural width of 7.5 kHz. Therefore, the light shift of the atoms due to this fluorescence can be suppressed to the $10^{-18}$ level.

Figure 9:
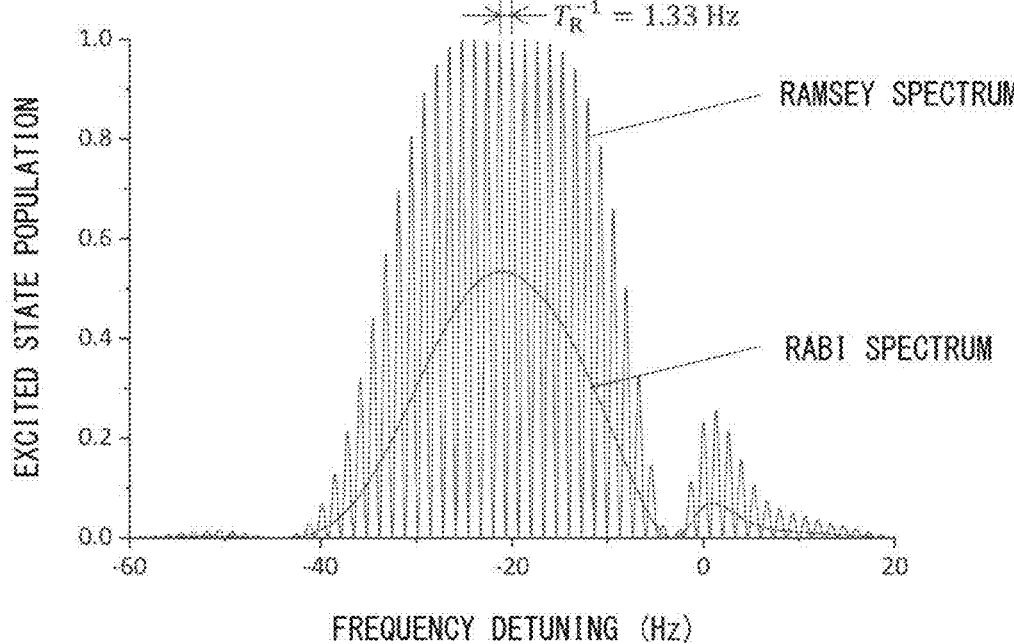
FIG. 9 is a graph showing the population of the excited states of the atom in the configuration shown in FIG. 6 as a function of frequency detuning.

FIG. 9 shows the population of excited states of atoms in the configuration of FIG. 6 as a function of frequency detuning (difference between light frequency and resonance frequency). The population of excited states of atoms irradiated with π/2 pulses in the first magnetic field generator M1 and the second magnetic field generator M2 is indicated by the Ramsey spectrum. As shown in the FIG. 9, the width $1/T_R$ of the Ramsey spectrum is 1.33 Hz, and the center frequency is detuned by $\Delta_P$=–21.3 Hz due to Zeeman shift. On the other hand, the population of excited states of atoms irradiated with π/2 pulses in the first magnetic field generator M1 is indicated by the Ramsey spectrum. The transition time δt when the atom passes through the first magnetic field generator M1 and the second magnetic field generator M2 is estimated to be δt=b/v=50 ms. Therefore, the line width is estimated to be 1/δt=20 Hz.

As mentioned above, the Ramsey spectrum is Zeeman shifted by $\Delta_P$=–21.3 Hz. In practice, this value depends on the spatial geometry of the first magnetic field generator M1 and the second magnetic field generators M2. However, this frequency shift can be stabilized with an precision of $10^{-18}$ by controlling the magnetic field. The sensitivity $\xi_1$ of the frequency to the change in the magnetic field δB is estimated to be –3.2 Hz/mT. The magnitude of this value is one order of magnitude smaller than the value $\delta v_z/\delta B$≈–46.6 Hz/mT expected from the second-order Zeeman shift. This is a result of the fact that the atoms are exposed to the magnetic field only at a specific location (the location of the first magnetic field generator M1 and the second magnetic field generators M2). In other words, the length of this specific point is substantially one order of magnitude smaller than the total interaction length. This low sensitivity allows an precision of $10^{-18}$ to be achieved using sub-μT or 100 ppm magnetic field control.

According to this embodiment, the magnetic field B does not exist in the entire atom movement path 12, but is limited to specific locations (i.e., the locations of the first magnetic field generator M1 and the second magnetic field generator M2). Thus, the spatial spacing for Ramsey spectroscopy can be arbitrarily designed by varying the interaction length $1_R$. For example, by increasing the interaction length $1_R$, the interaction time T=$1_R$/v is extended, and as a result, the frequency resolution is improved by 1/T. In addition, since the atomic excitation region and the state observation region are spatially separated, continuous observation of atomic transitions becomes possible. As mentioned above, since there is only one probe, the coherence of the probe laser does not deteriorate even when the interaction length $1_R$ is increased, and the effect is that highly accurate frequency measurement can be performed continuously. Note, however, that in reality the interaction length $1_R$ is limited by the Rayleigh length of the lasers comprising the optical lattice or the coherence time of the probe laser.

The above explanation was given for the example of using $^{88}$Sr as an atom. However, the atom used in this embodiment is not limited to this. This embodiment is applicable to atoms with forbidden transitions, in which transitions are allowed by mixing of states due to the application of a magnetic field. For example, this embodiment can be applied to IIA group elements other than Sr such as Mg and Ca, IIB group elements such as Zn, Cd, and Hg, and Yb.

Sixth Embodiment

Figure 10:
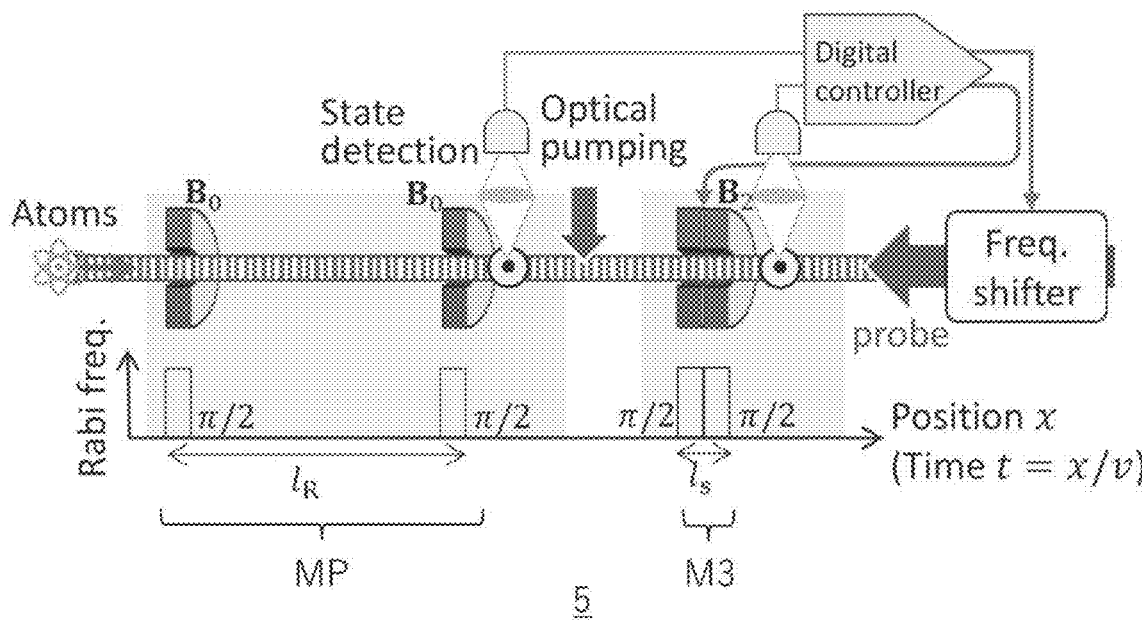
FIG. 10 is a schematic diagram of the atomic transition frequency measurement device in the configuration of FIG. 6.

FIG. 10 is a schematic diagram of an optical lattice clock or atomic oscillator 5 according to the sixth embodiment (a probe laser frequency control circuit is added to FIG. 5). The optical lattice clock or atomic oscillator 5 comprises a third magnetic field generator M3 at the front or rear stage of the pair of magnetic field generators MP, in addition to the configuration of the atomic transition frequency measurement device 4 in FIG. 5. As described below, the third magnetic field generator M3 is a magnetic field generator for Rabi spectral measurement. The third magnetic field generator M3 generates a magnetic field $B_2$ orthogonal to the atom movement path 12 in the atom movement path 12. Here, the interaction length $1_s$ between the atom and the magnetic field $B_2$ is 4 mm. The first magnetic field generator M1 and the second magnetic field generator M2 are arranged by spacing them apart from each other. In contrast, the third magnetic field generator M3 is composed by arranging the first magnetic field generator M1 and the second magnetic field generator M2 adjacent to each other without spacing between them.

Figure 11:
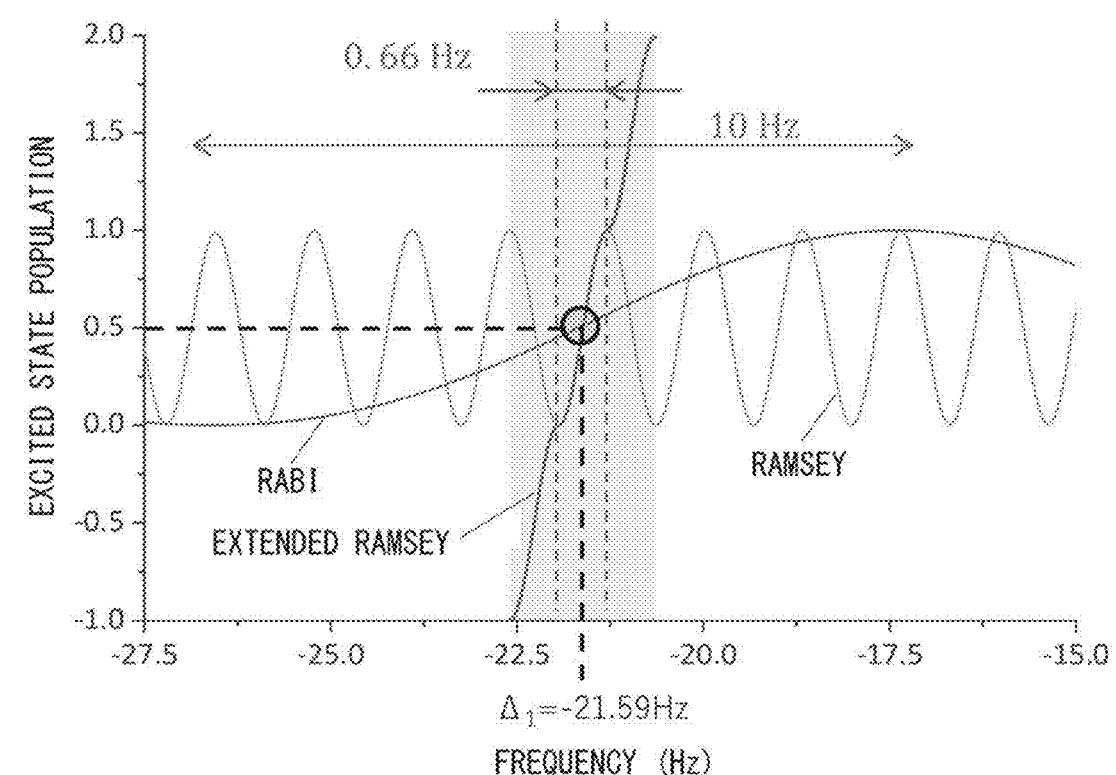
FIG. 11 is a graph showing the Ramsey spectrum and the Ram spectrum in the configuration of FIG. 7.

FIG. 11 shows the Ramsey spectrum for the interaction length $1_R$, the length between the first magnetic field generators M1 and the second magnetic field generators M2, and the Rabi spectrum for the interaction length $1_s$, the length of third magnetic field generator M3 along the atom movement path 14. An atom moving at a velocity v=40 mm/s on the axis of the probe laser is given a π pulse by the probe laser in the region of magnetic field $B_2$ during $T_s=1_s/$v=0.1 s. Therefore, the line width of the Rabi spectrum is $1/T_s≈10$ Hz. The sensitivity $\xi_2$ of the frequency to the change in the magnetic field δB is estimated to be −35.6 Hz/mT. This value is one order of magnitude larger than the sensitivity $\xi_1=−3.2$ Hz/mT for the Ramsey spectrum. By providing a magnetic field $B_2=0.99$ mT, the shoulder of the Rabi excitation spectrum can be aligned with the frequency lock point $\Delta_1=−21.59$ Hz. However, this frequency lock point is defined by the Ramsey spectrum where the excitation probability $p_1$ is 0.5. The magnitude of the magnetic field $|B_2|$ can be controlled by compensating for the long-term drift of the magnetic field so that the probability of Rabi excitation $p_2$ is 0.5. By measuring the Ramsey spectrum and the Rabi spectrum simultaneously in this way, the measurement area of the Ramsey spectrum can be extended.

FIG. 11 shows an example of using this technique to extend the measurement range of the Ramsey spectrum from 0.66 Hz to about 3 times. This extension range can be up to 10 Hz, which is determined by the line width of the Rabi spectrum.

As shown in FIG. 11, in the Ramsey spectrum, the population p of excited states is proportional to the frequency change if cumulative phase θ in the measurement time $T_R$ is in the range of $|θ|≤π/2$.

<IMG SRC="TU-70024WO number 1.bmp">          [Equation 1]

However, the proportionality relationship reverses and the population p behaves in an oscillatory manner if cumulative phase θ exceeds this range. This limits the range where the Ramsey spectrum can be used effectively, which in FIG. 11 is 0.66 Hz. Simultaneous measurement of the Rabi spectrum with shorter interrogation time provides information on the temporal fluctuation v(t) of the laser frequency. Using this, the cumulative phase due to laser frequency fluctuations during Ramsey spectroscopy can be estimated even for $|θ|>π/2$. Using this result, the measurement region of the Ramsey spectrum can be extended by setting p=2−p (if π/2≤θ≤3π/2) and p=−p (if −3π/2<θ<−π/2). FIG. 11 shows an example of using this technique to extend the measurement range of the Ramsey spectrum from 0.66 Hz to about 3 times. By applying this technique, the extended range can be up to 10 Hz, which is determined by the line width of the Rabi spectrum with shorter interrogation time.

Figure 12:
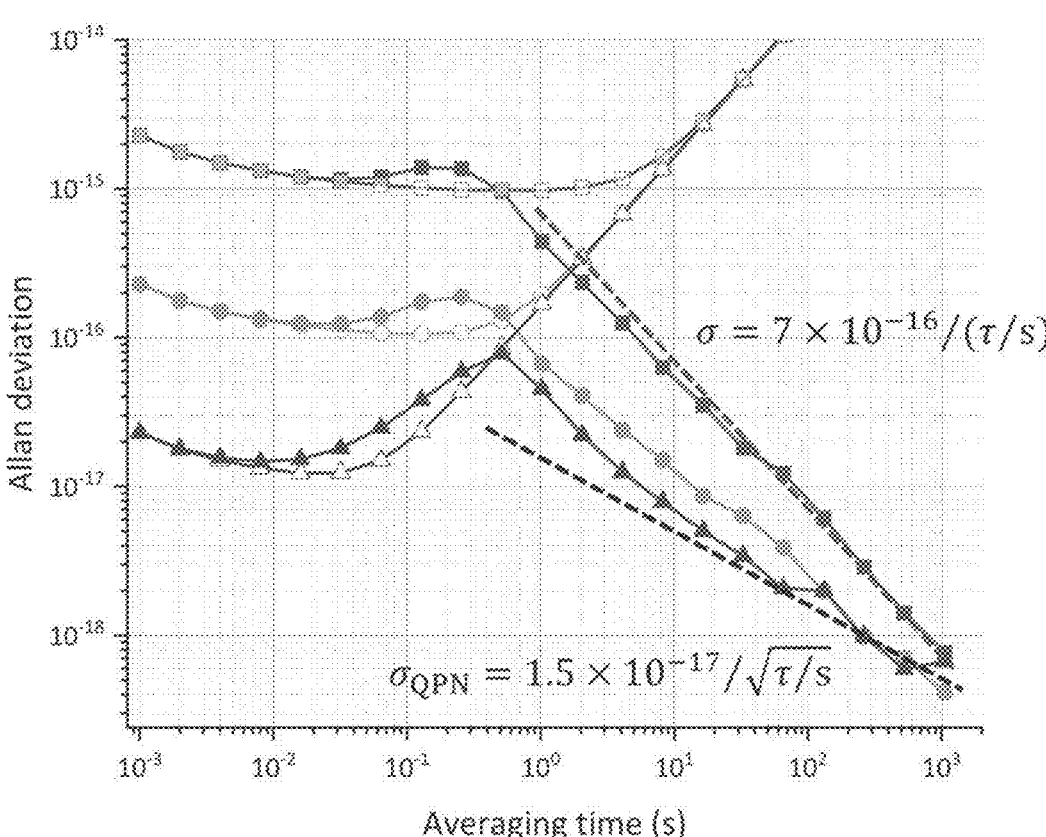
FIG. 12 is a graph showing the results of a simulation to confirm the effect of the sixth embodiment.

FIG. 12 shows the simulation results to confirm the effect of this embodiment. The horizontal axis represents the average time and the vertical axis represents the Allan deviation. The white plots (□, ○, △) indicate the stability of the laser used. Filled plots (■, •, ♦) show the simulation results for the stability of the atomic clock obtained by this embodiment. In this simulation, a measurement by 1000 atoms per second was assumed. As a result of the extension of the measurement area by the Ramsey spectrum and the continuous measurement, it can be seen that a fractional stability of $10^{−19}$ is reached in an average time of about 10000 seconds (■), by applying laser with a flicker floor of $1×10^{−15}$ (□). This result is comparable to the results conventionally obtained using extremely high-precision lasers (•, ♦).

According to this embodiment, the measurement range of the Ramsey spectrum can be extended.

Seventh Embodiment

Figure 13:
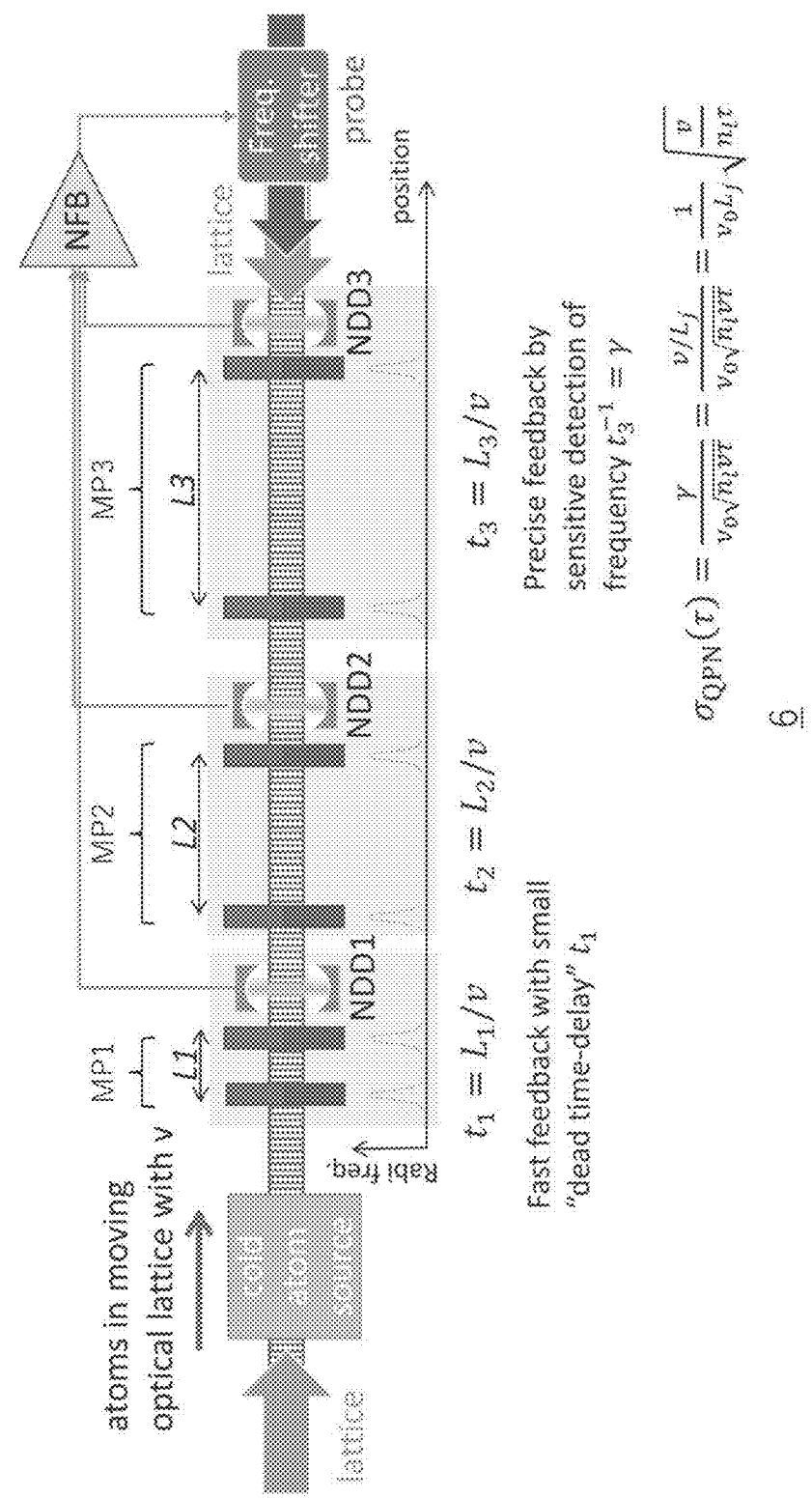
FIG. 13 is a schematic diagram of the atomic transition frequency measurement device according to the seventh embodiment.

FIG. 13 is a schematic diagram of the optical lattice clock or atomic oscillator 6 according to the seventh embodiment (a probe laser frequency control circuit is added to FIG. 5). While the atomic transition frequency measurement device 4 in FIG. 5 has one pair of magnetic field generators (MP), the optical lattice clock or atomic oscillator 6 has three pairs of magnetic field generators (MP1, MP2, and MP3). The pair of magnetic field generators MP1, MP2 and MP3 each comprise two magnetic field generators. The interaction length L1 of the magnetic field generator pair MP1, the interaction length L2 of the magnetic field generator pair MP2, and the interaction length L3 of the magnetic field generator pair MP3 are different from each other. In this example, L1<L2<L3.

The uncertainty relationship between the frequency measurement uncertainty Δv and the observation time Δt is Δv·Δt=1. Therefore, for a pair of magnetic field generators with a short interaction length (MP1), the short atom-laser interaction time (Δt is small) gives wide spectrum linewidth (Δv is large). Conversely, for the pair of magnetic field generators with a long interaction length (MP3), the spectrum linewidth Δv is small, but the measurement time of excitation probability is long (Δt is large). The feedback bandwidth and feedback precision can be balanced by making it possible to select each feedback frequency band. In this embodiment, since multiple measurements are required for one atom, it is suitable to measure the atom while keeping it in the optical lattice without heating it. One example of this embodiment is to excite the aforementioned $^1S_0$–$^3P_1$ transition and observe fluorescence while laser cooling.

According to this embodiment, measurement precision and measurement time can be balanced and the dynamic range of feedback control can be extended.

Eighth Embodiment

Figure 14:
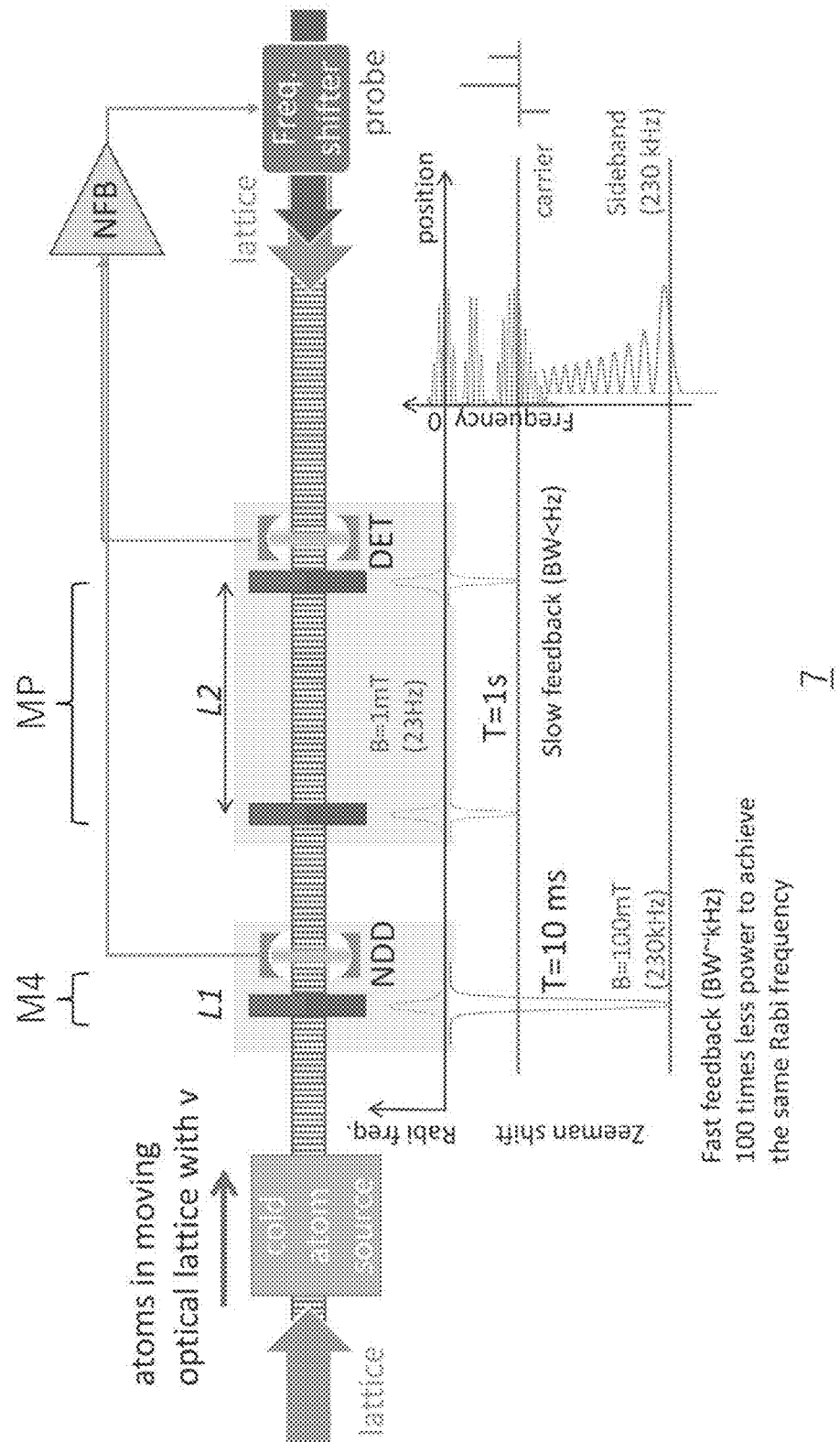
FIG. 14 is a schematic diagram of the atomic transition frequency measurement device according to the eighth embodiment.

FIG. 14 is a schematic diagram of an optical lattice clock or atomic oscillator 7 according to the eighth embodiment (a probe laser frequency control circuit is added to FIG. 5). The optical lattice clock or atomic oscillator 7 comprises a fourth magnetic field generator M4 at the front or rear stage of the pair of magnetic field generators MP, in addition to the configuration of the atomic transition frequency measurement device 4 in FIG. 5. The optical lattice clock or atomic oscillator 7 is characterized in that the probe light is not a single frequency but contains sidebands. In other words, in this embodiment, the sidebands are also used in the atomic transition frequency measurement. Generating a strong magnetic field B4 at M4 increases the transition dipole moment by increasing the mixing by the magnetic field. Since the second-order Zeeman shift also increases at this time, sidebands are formed by using electro-optic elements to probe the atomic transitions. This sideband can be used to measure this transition independently of the clock transition in the main band.

According to this embodiment, it is possible to achieve high stability of optical lattice clocks by shortening the observation time and performing fast feedback control.

Ninth Embodiment

FIG. 15 is a schematic diagram of the atom movement path according to the ninth embodiment of the atomic transition frequency measurement system. This atom movement path is comprises an optical waveguide with a hollow core fiber. In this embodiment, the magnetic field is fixed and the optical lattice is moved. In other words, the optical lattice moves and transports atoms in the hollow core fiber. The magnetic field can be realized by magnetic disks, magnetic tapes, loop currents in printed circuit boards, etc. Since the radial distribution of atoms can be limited to a region of about 10 μm, the uniformity of the radial magnetic field should cover about 10 μm.

According to this embodiment, the entire device can be downsized.

Tenth Embodiment

Figure 16:
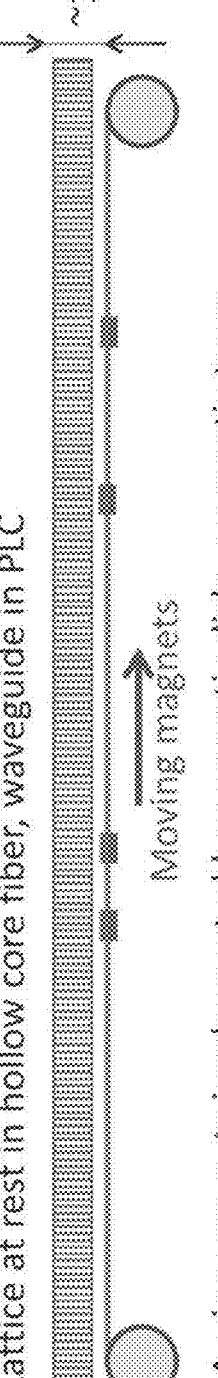
FIG. 16 is a schematic diagram of the atom movement path of the atomic transition frequency measurement device according to the tenth embodiment.

FIG. 16 is a schematic diagram of the atom movement path of the tenth embodiment of the atomic transition frequency measurement device. This atom movement path also comprises an optical waveguide using a hollow core fiber. Contrary to the ninth embodiment, this embodiment fixes the optical lattice and moves the magnetic field. The magnetic field can be realized with magnetic disks, magnetic tapes, etc. Since the radial distribution of atoms can be limited to a region of about 10 μm, the uniformity of the radial magnetic field should cover about 10 μm.

According to this embodiment, the entire device can be downsized.

Eleventh Embodiment

Figure 17:
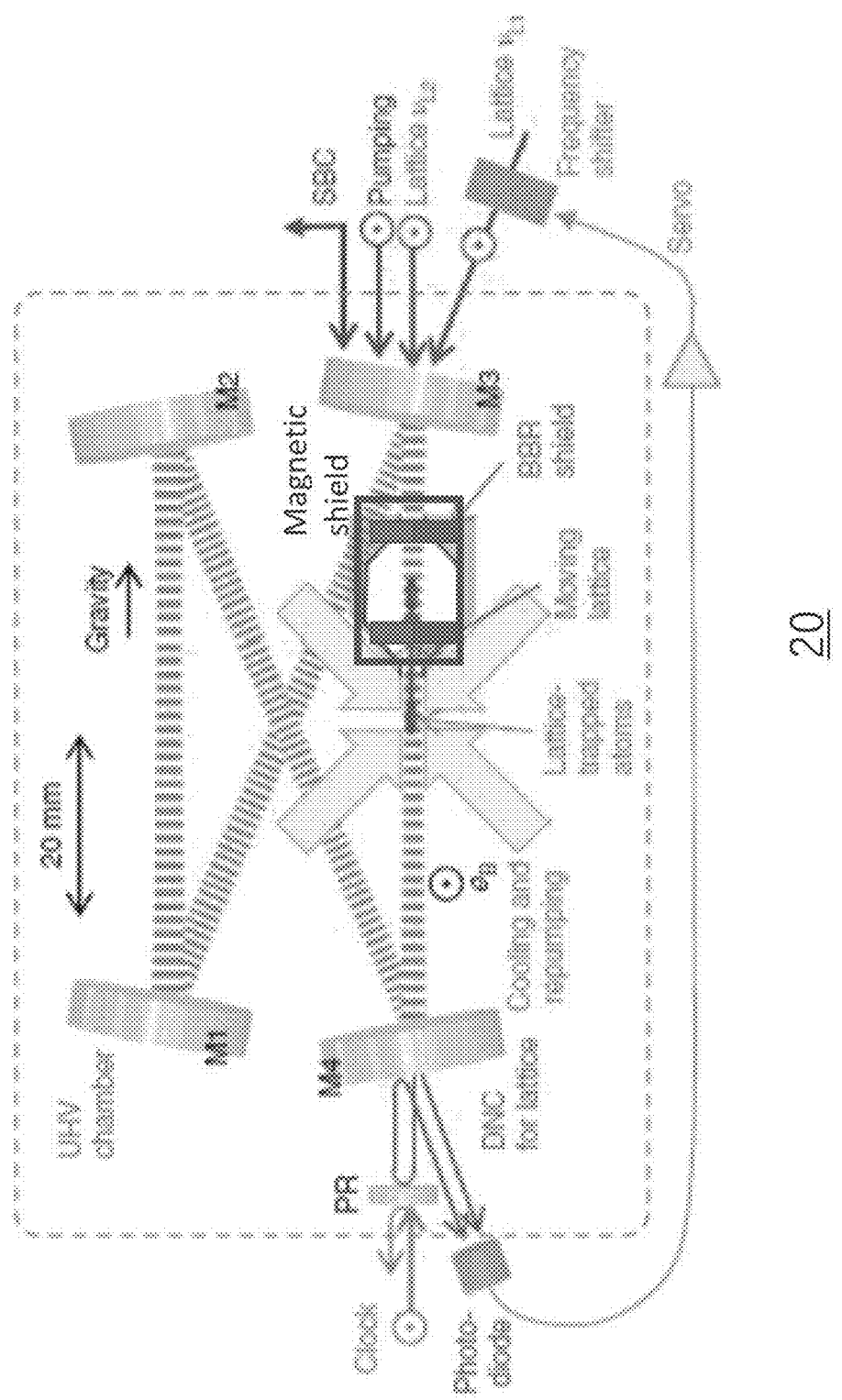
FIG. 17 is a schematic diagram of the optical lattice clock according to the eleventh embodiment.

FIG. 17 shows a schematic diagram of an optical lattice clock 20 according to the eleventh embodiment. The optical lattice clock 20 comprises an electronic state splitter for atoms of any of the aforementioned embodiments. The optical lattice clock itself may use existing technology (see, for example, Non Patent Literature 8), and the part that performs the atomic transition frequency measurement may be replaced with the configuration of the aforementioned embodiment. In this case, the magnetic field can be generated by two magnets or two sets of Helmholtz coils.

According to this embodiment, a compact and highly accurate optical lattice clock can be realized.

Twelfth Embodiment

Figure 18:
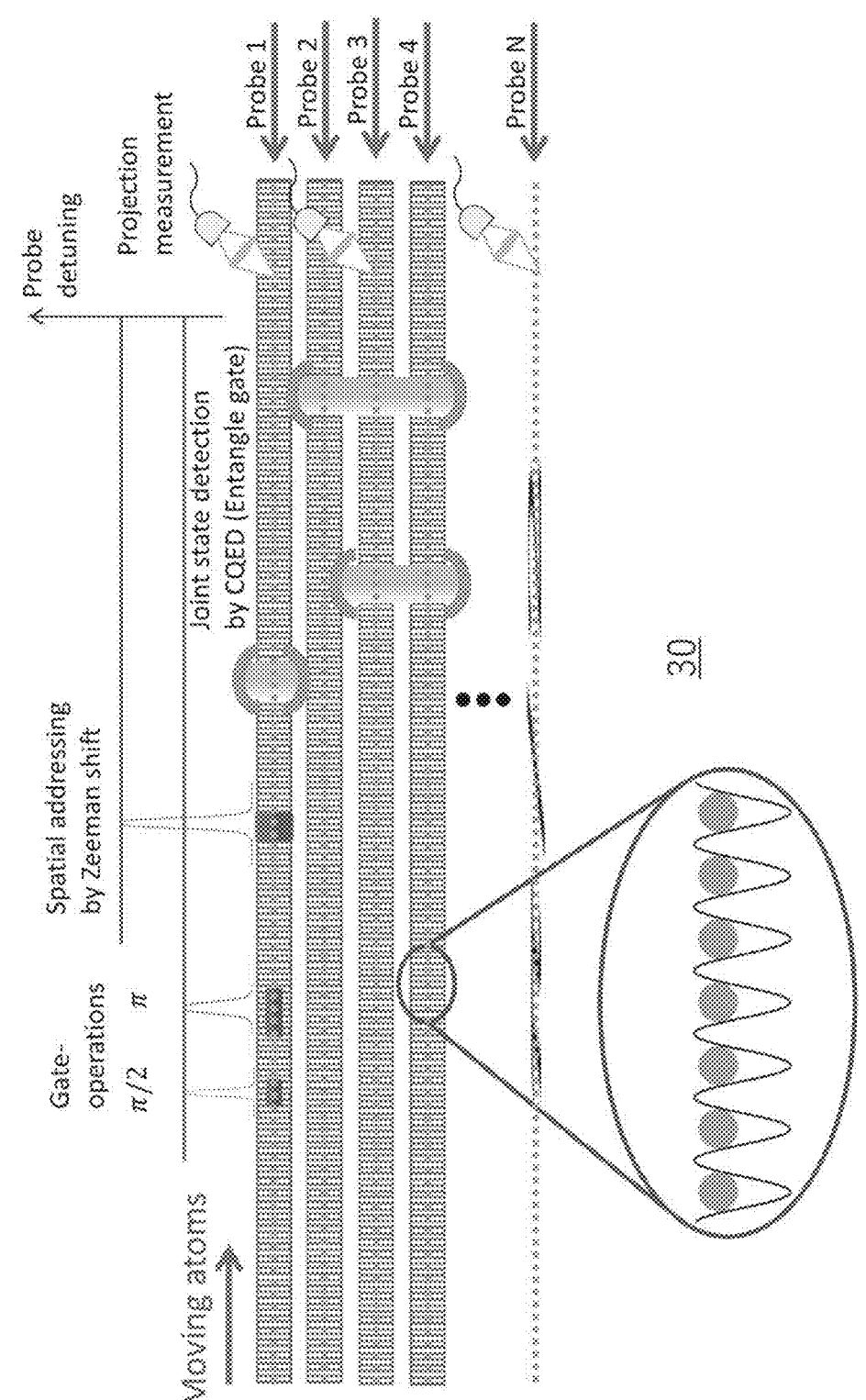
FIG. 18 is a schematic diagram of the quantum computer according to the twelfth embodiment.

FIG. 18 is an enlarged schematic diagram of a portion of the quantum computer 30 according to the twelfth embodiment. The quantum computer 30 comprises atoms captured in a moving optical lattice and an electronic state splitter for atoms according to one of the aforementioned embodiments. In other words, the superposition of quantum states by π/2 pulses of the electronic state splitter for atoms can be used as the Hadamard gate of the quantum computer 30. Each atom captured in the optical lattice functions as a qubit. In order to construct a quantum computer, it is necessary to realize the basic arithmetic functions for qubits, which can be realized as follows using the configuration of this embodiment.

The qubit is represented by whether the atoms are in the ground state or excited state.

Each atom is a flying qubit moving with velocity v, and undergoes a quantum operation spatially during moving.

The probe laser is placed on each moving optical lattice, and the atoms are manipulated in their states by using a local magnetic field.

The superposition of bit 0 and bit 1 is generated by using the excitation of pulse area π/2.

The excitation of pulse area π is used to invert the excited state of the atom, i.e., to invert the bit.

The amount of Zeeman shift is varied by the position and magnitude of the magnetic field applied, and the qubits are individually addressed according to the frequency of the probe laser.

The CQED (Cavity Quantum Electrodynamics) technique is used to create a quantum entanglement state between neighboring atoms in the same moving optical lattice.

The moving optical lattice in which atoms are captured and the corresponding probe lasers can be extended to N rows.

The quantum entanglement state can be formed between adjacent atoms in one optical lattice, using circuit QED (cQED).

This allows the formation of two-dimensional quantum entangled states.

Each probe light and local magnetic field can be varied in time.

After a series of quantum operations, the state of each atom is measured by projective measurement.

According to this embodiment, a quantum computer that is compact and highly scalable in terms of quantum bits can be realized.

Thirteenth Embodiment

The thirteenth embodiment is a voltage/current controlled atomic oscillator. This atomic oscillator comprises the atomic transition frequency measurement device according to any of the aforementioned embodiments. A Helmholtz coil is used to generate the magnetic field. For example, if the radius of the Helmholtz coil is 0.5 mm, a magnetic field with a flux density of 1.9 mT/A can be generated in response to the current. Since 5 μA of current noise corresponds to a frequency error of about 0.4 mHz, by suppressing the current noise to about 5 μA or less (which is sufficiently accurate for practical use), a relative uncertainty of $10^{-18}$ relative uncertainty, a voltage-controllable atomic oscillator with a relative uncertainty of $10^{-18}$ can be realized.

According to this embodiment, a compact and highly accurate atomic oscillator can be realized.

Fourteenth Embodiment

Figure 19:
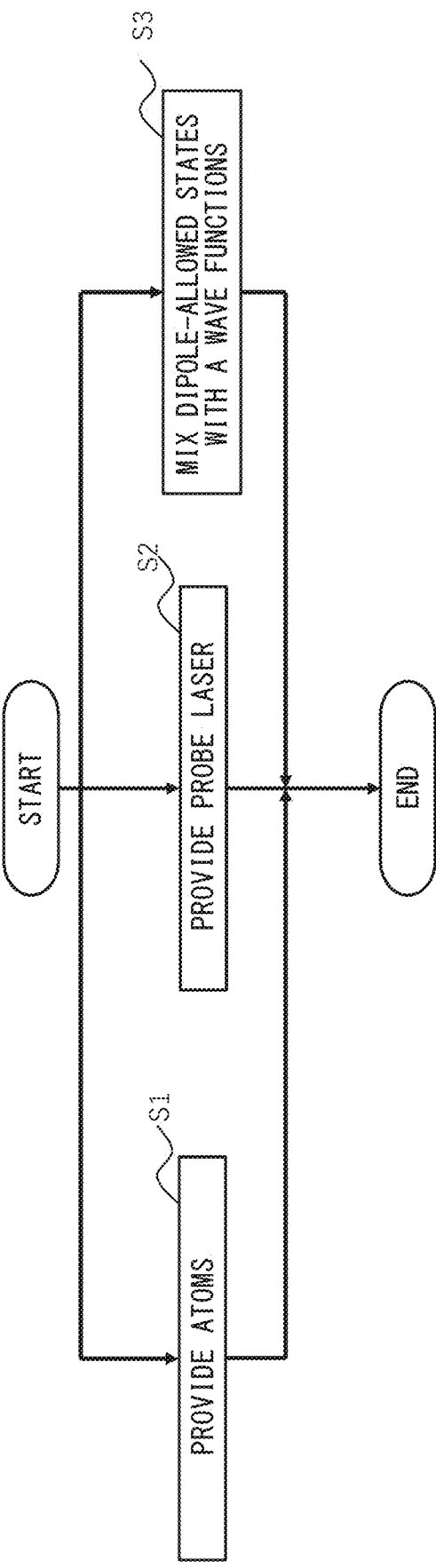
FIG. 19 is a flowchart of the generation method of a superposition state of electronic states of atoms according to the fourteenth embodiment.

FIG. 19 is a flowchart of the method for generating the electronic state superposition state of atoms according to the fourteenth embodiment. This method of generating the superposition of electronic states of atoms uses the electronic state splitter for atoms according to the aforementioned embodiment. The electronic state splitter for atoms comprises an atom suppler, an atom movement path, a probe laser light source, and a magnetic field generator.

The method of generating a superposition state of electronic states of atoms comprises supplying atoms moving at a constant velocity along the atom movement path using the atom supplier (step S1), providing in the atom movement path a probe laser that propagates on the same axis as the atom movement path in the same direction as or opposite to the motion of the atoms using the probe laser source (step S2) and generating in the atom movement path a magnetic field orthogonal to the atom movement path to cause mixing of the wavefunction with the dipole-allowed electronic state, thereby enabling excitation of the clock transitions by the probe laser using the magnetic field generator (step S3). As shown in FIG. 19, these three steps proceed in parallel as a result of being unfolded in space.

The method may further comprise the step of feedback control of the probe laser frequency by observing the atoms.

According to this embodiment, an arbitrary pulse area can be achieved using a uniform probe laser. Therefore, it is possible to realize an electronic state splitter for atoms, which can branch the internal states of atoms into arbitrary superposition states. This method of generating superposition states of electronic states of atoms can be applied to various applications such as atomic transition frequency measurement devices, atomic oscillators, optical lattice clocks, and quantum computers.

Fifteenth Embodiment

In the embodiment of the present invention, compensation of frequency changes caused by the Doppler effect (hereinafter referred to as Doppler shift) is an important issue. For example, the Doppler effect is 57 kHz if the moving velocity of the optical lattice is 40 mm/s. In this case, to obtain a measurement precision of 18 digits, the Doppler effect must be compensated down to 0.4 mHz. This compensation is extremely important in realizing a high-precision longitudinally excited Ramsey clock. The device according to the fifteenth embodiment comprises a Doppler shift compensator.

Figure 20:
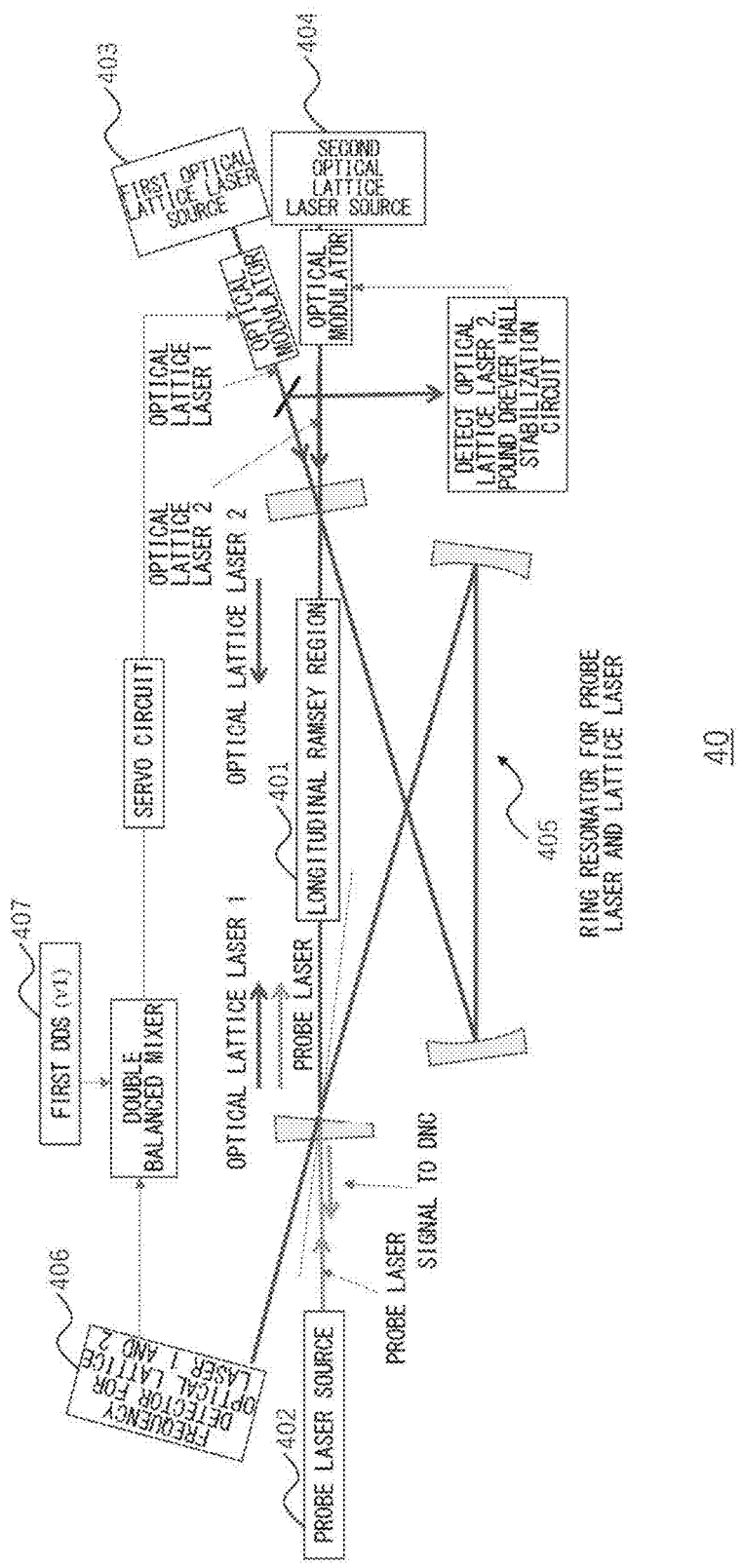
FIG. 20 is a schematic diagram of the Doppler shift compensator according to the fifteenth embodiment.
Figure 21:
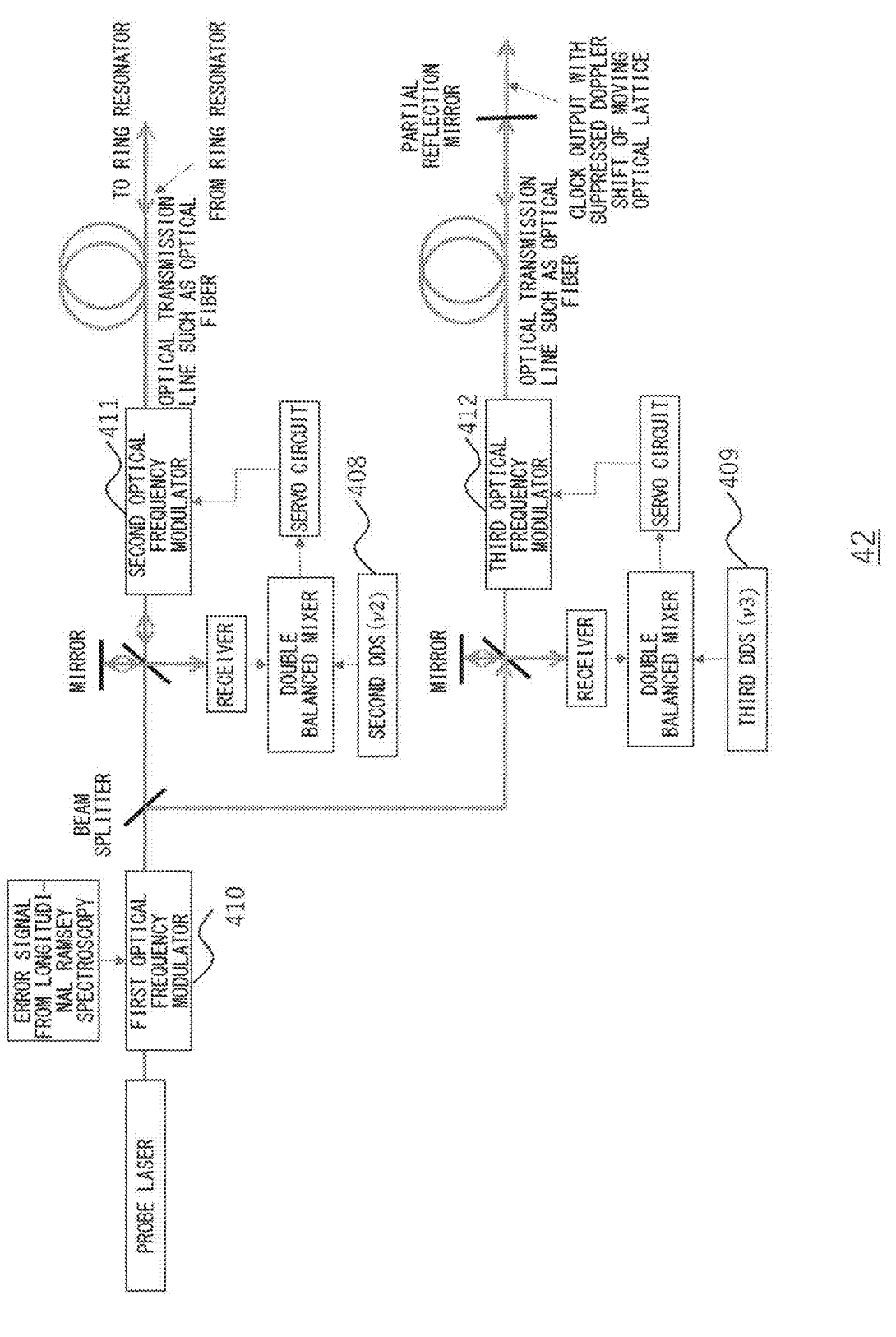
FIG. 21 is a schematic diagram of the optical measurement system in the Doppler shift compensator of FIG. 20.

FIG. 20 is a schematic diagram of the Doppler shift compensator 40 of the fifteenth embodiment. FIG. 21 is a schematic diagram of the optical measurement system 42 in the Doppler shift compensator 40 of FIG. 20. The Doppler shift compensator 40 comprises a ring resonator 405 for the probe laser and the optical lattice laser, a beat frequency detector 406 for the optical lattice laser 1 and the optical lattice laser 2, a first DDS 407, a second DDS 408, a third DDS 409, a first optical frequency modulator 410, a second optical frequency modulator 411 and a third optical frequency modulator 412, in addition to the configuration of the electronic state splitter 2 for atoms according to the second embodiment (i.e., a longitudinally excited Ramsey region 401, a probe laser light source 402 supplying a probe laser, a first lattice laser source 403 supplying an optical lattice laser 1 and a second lattice laser source 404 supplying an optical lattice laser 2). Here, DDS refers to a direct digital synthesizer.

Doppler shift compensation is performed by three DDSs (i.e., first DDS 407, second DDS 408, and third DDS 409) that refer to the same reference clock. The frequency v1 of the first DDS 407, v2 of the second DDS 408 and v3 of the third DDS 409 are as follows $$v1 = 2 \cdot (v/c) \cdot f1$$

v2: driving frequency of the optical frequency modulator (arbitrary)

$$v3 = v2 + (v/c) \cdot f2$$

where f1 is the frequency of the optical lattice laser, known as the magic frequency, which is a known value of nine-digit number, f2 is the frequency of the probe laser, which is a known value of fifteen-digit number, v is the velocity of the moving optical lattice (an arbitrary set value) and c is the velocity of light. The frequency of the optical lattice laser 1 and the frequency of the optical lattice laser 2 are given by f1(1)=f1(1+v/c) and f1(2)=f1(1−v/c), respectively.

The operating procedure of the Doppler shift compensator 40 is as follows (see FIG. 20 and FIG. 21).

(1) Determine the velocity v by v1.
(2) Set the frequency v2 of the optical frequency modulator.
(3) Using the frequency v1 of the first DDS 407 and the frequency v2 of the second DDS 408, set the frequency v3 of the third DDS 409 by the relation v3=v2+(v½)·(f2/f1).

According to this embodiment, the Doppler shift can be effectively compensated.

A DC magnetic field in the above embodiments may also be an AC magnetic field. In particular, an AC magnetic field with a magic frequency (e.g., a magnetic field with a magnetic field component of laser light set to the magic frequency) is an useful embodiment.

In the abovementioned 15 embodiments, atoms in constant velocity motion are made to interact with a local magnetic field by a moving optical lattice of the magic wavelength. This mixing of states with the allowed transitions due to the local magnetic field allows for continuous Rabi or Ramsey spectroscopy. However, this technique has some problems as below.

The atomic spectrum is perturbed by a large second-order Zeeman shift.

Calibration of the magnetic field is required to determine the value of this second-order Zeeman shift.

Heating of the coils used to generate the magnetic field causes non-uniform blackbody radiation.

Heat generated by the coils used to generate the magnetic field causes non-uniform blackbody radiation.

The heat generated by the coils used to generate the magnetic field generates non-uniform blackbody radiation.

Sixteenth Embodiment

In order to solve these problems, the embodiment described below uses clock transitions caused by hyperfine mixing of isotopes of alkaline earth metal atoms with nuclear spins (including Yb atoms in addition to alkaline earth metal atoms). Hereafter, the embodiment of inducing transitions by mixing of states due to a local magnetic field, as in the aforementioned fifteen embodiments, may be referred to as "magnetic field-induced". In contrast, the embodiment that uses the clock transitions caused by the following hyperfine mixing to induce local excitation using the first-order Zeeman shift that changes spatially due to magnetic field shielding is sometimes referred to as the "magnetic field shielding type".

Figure 22:
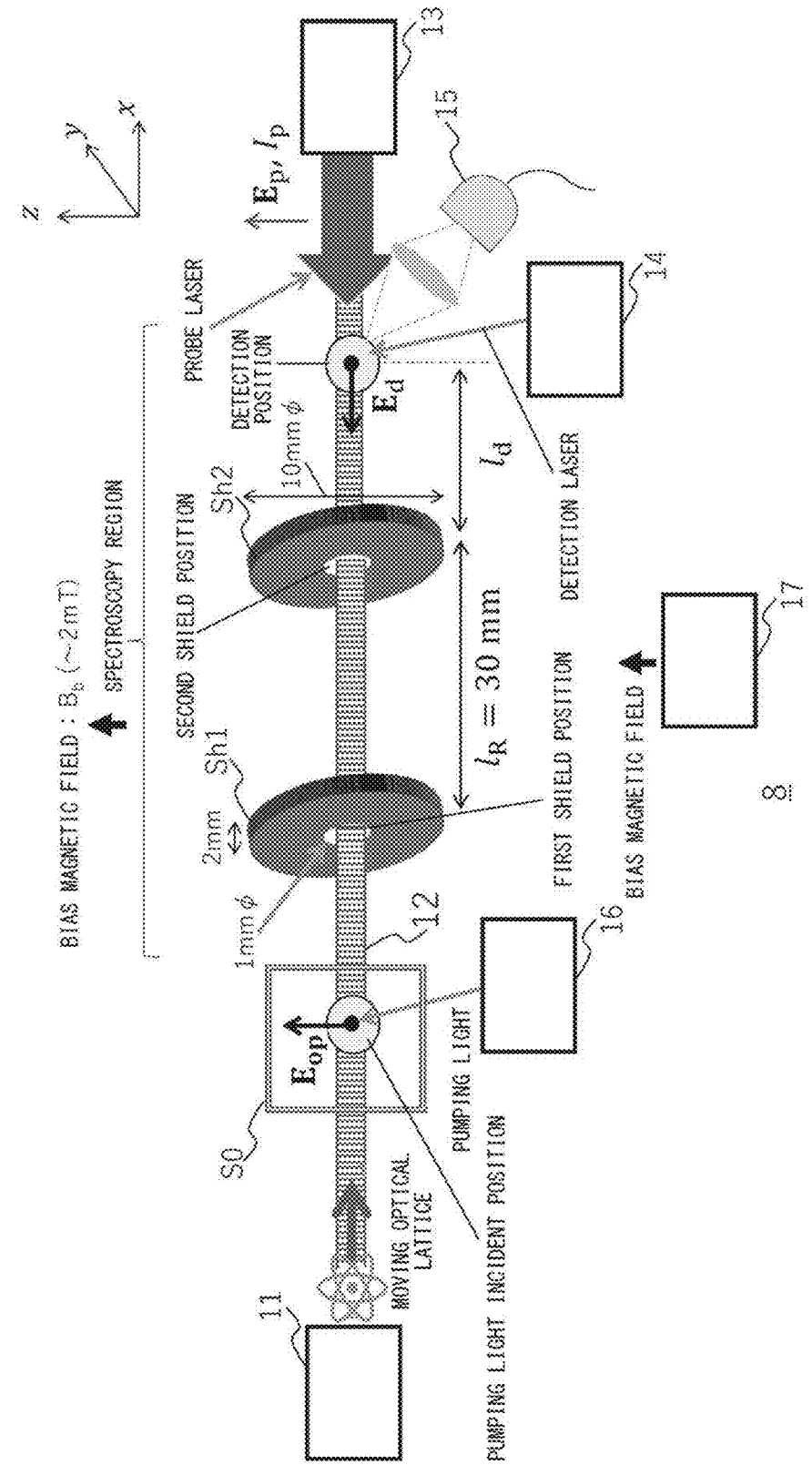
FIG. 22 is a schematic diagram of the atomic transition frequency measurement device according to the sixteenth embodiment.

FIG. 22 is a schematic diagram of the sixteenth embodiment of the atomic transition frequency measurement device 8. The atomic transition frequency measurement device 8 comprises an atom supplier 11, an atom movement path 12 extending in the x direction, a probe laser source 13, a magnetic field source 17, a first magnetic shield Sh1, a second magnetic shield Sh2, a detection laser source 14, a detector 15, and a pump light source 16. The spectral region is defined between the first magnetic shield Sh1 and the second magnetic shield Sh2. The spectral region is subjected to a bias magnetic field $B_b$ in a direction orthogonal to the atom movement path 12 using a magnetic field source 17. The bias magnetic field $B_b$ in FIG. 22 is about 2 mT and is a uniform magnetic field oriented in the z direction. However, the bias magnetic field $B_b$ is not limited to this. In other words, the bias magnetic field $B_b$ does not have to be 2 mT in strength, nor does it have to be uniform.

As explained above, the atom supplier 11 supplies atoms moving in the x direction along the atom movement path 12 as a moving optical lattice. However, the atom here is an alkaline earth metal atom with nuclear spin I (in this example, [87]Sr with I=9/2). The moving optical lattice of [87]Sr supplied by the atom supplier 11 moves at a constant velocity v (e.g. v=40 mm/s) along the atom movement path 12.

The probe laser source 13 provides in the atom movement path 12 a probe laser that propagates in the opposite or same direction (i.e., −x or +x direction) as the motion of the atom concerned on the same axis as the atom movement path 12. That is, the direction of propagation of the probe laser is parallel or antiparallel to the direction of motion of the atom. The example in FIG. 22 shows a probe laser propagating in the opposite direction to the motion of [87]Sr. The probe laser resonates with the Zeeman-shifted clock transition in [87]Sr at I=9/2. In the example in FIG. 22, the probe laser is injected with two frequencies corresponding to the $^1S_0$ (m=±I) to $^3P_0$ (m=±I) transition.

The first magnetic shield Sh1 and the second magnetic shield Sh2 are arranged around the atom movement path 12. In the example of FIG. 22, the first magnetic shield Sh1 and the second magnetic shield Sh2 comprise a circular ring made of permalloy, for example. Their dimensions are, for example, 10 mm in outer diameter, 1 mm in inner diameter (aperture diameter), and 2 mm in thickness (needless to say, they are not limited to these values). The atom movement path 12 penetrates the openings of the first magnetic shield Sh1 and the second magnetic shield Sh2. The magnetic field is reduced in the interior surrounded by the first magnetic shield Sh1 and the second magnetic shield Sh2 (hereinafter also referred to as "magnetic shield position"). The magnetic shield position also has a weak magnetic field (e.g., a minimum of about 32 μT in the configuration shown in FIG. 22), which causes a Zeeman shift that depends on the magnetic sublevel m.

The detection laser source 14 injects a detection laser that excites $^1S_0$ (F=I, m=±I) →$^3P_1$ (F=I+1, m=±(I+1)) of [87]Sr at the detection position. By making the Zeeman shift sufficiently large with respect to the natural width of the transition of approximately 7.5 kHz, atoms in the m=±I state can be separated and measured by the Zeeman shift. In the example in FIG. 22, the detection position is a distance $1_d$ away from the second magnetic shield Sh2.

Detector 15 measures the interference of the probability amplitude as the population of excited states of atoms, caused by the excitation of atomic transitions in magnetic shield Sh1 and in the second magnetic shield Sh2. Here, the population of excited atoms per photon is less than 1 in order to reduce the collisional shift.

Pump light source 16 injects pump light at the pump light injection position. This excites the 7E transition of the F=I→I−1 transition, and light pumps to two magnetic sublevels with m=±I. In the configuration shown in FIG. 22, the magnetic field is shielded so that the Zeeman spread is about the saturation width of the excitation (magnetic shield Sh0).

Figure 23:
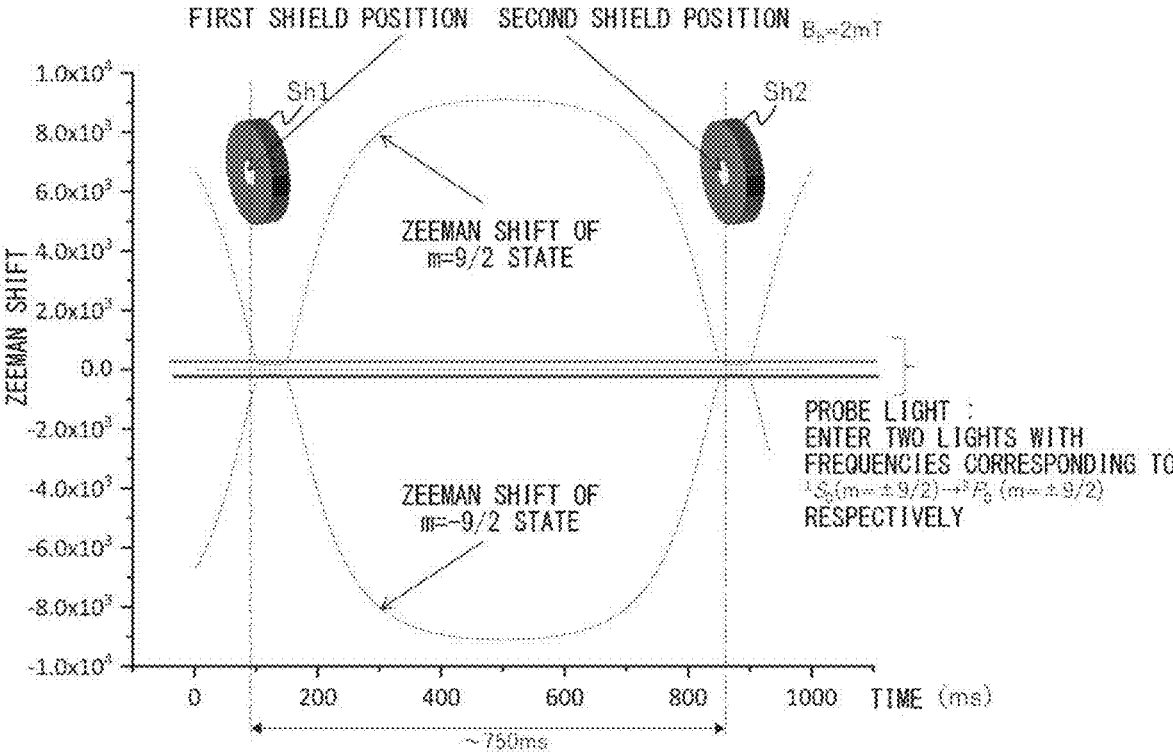
FIG. 23 shows the Zeeman shift in the spectral region of FIG. 22.

FIG. 23 shows the Zeeman shift in the spectral region of FIG. 22 (Zeeman sublevel m =9/2). However, the bias magnetic field $B_b$ is a uniform magnetic field with a strength of 2 mT. The atom moving along the atom movement path is [87]Sr with nuclear spin I=9/2. The atom moves at a velocity of about 40 mm/s. The first magnetic shield Sh1 and the second magnetic shield Sh2 are about 30 mm apart from each other. Therefore, it takes about 750 ms for the atoms to move from the first magnetic shield Sh1 to the second magnetic shield Sh2. As a result of the existence of a weak magnetic field (e.g., a minimum of about 32 μT in the configuration of FIG. 22) also at the magnetic shield positions, a Zeeman shift dependent on the magnetic sublevel m is created. This first-order Zeeman shift is converted by m×1.06×106 Hz/T, which is about 150 Hz for m=9/2. As shown in FIG. 23, a large Zeeman shift occurs at positions outside the magnetic shield, and the atoms are non-resonant to the probe laser light.

Figure 24:
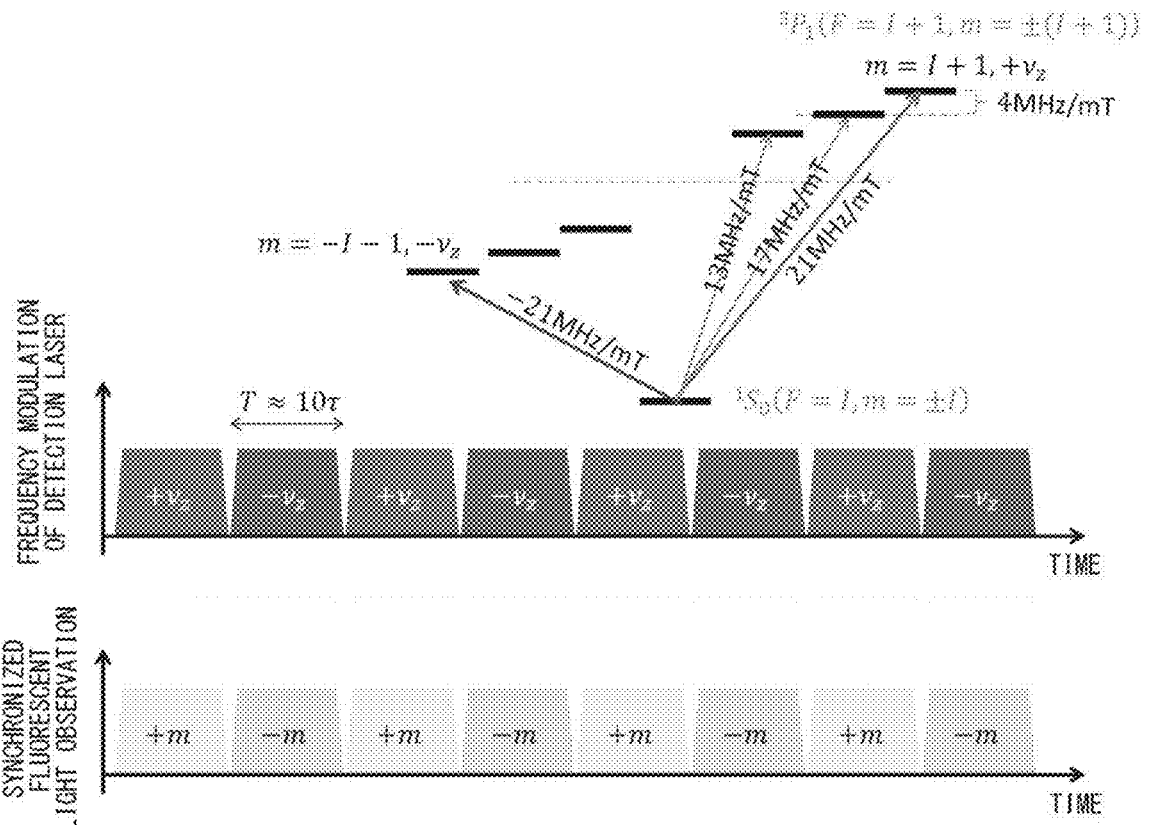
FIG. 24 is a schematic diagram showing the principle of measuring the population of magnetic sublevels with $m=\pm I$.

FIG. 24 schematically illustrates the principle of measuring the population of each state for each magnetic sublevel of m=±I. The upper figure shows the energy levels in the $^1S_0$ (F=I, m=±I) to $^3P_1$ (F=I+1, m=±(I+1)) transition of [87]Sr. Here, the laser frequency of the detection laser, which has a linear polarization orthogonal to the bias field $B_b$ (i.e., it is a superposition of rightward and leftward circular polarizations for the quantization axis taken in the direction of the bias field $B_b$), is modulated by ±$v_z$ (period T) and the fluorescence measurement is synchronized to it. The Zeeman shift of the adjacent magnetic sub-levels excited by the rightward and leftward circularly polarized light is 16 MHz (>7 kHz, natural width) if B=2 mT. As a result, the excitation by the detected light that causes optical pumping of the magnetic sub-levels to the ground state during detection can be sufficiently small.

Figure 25:
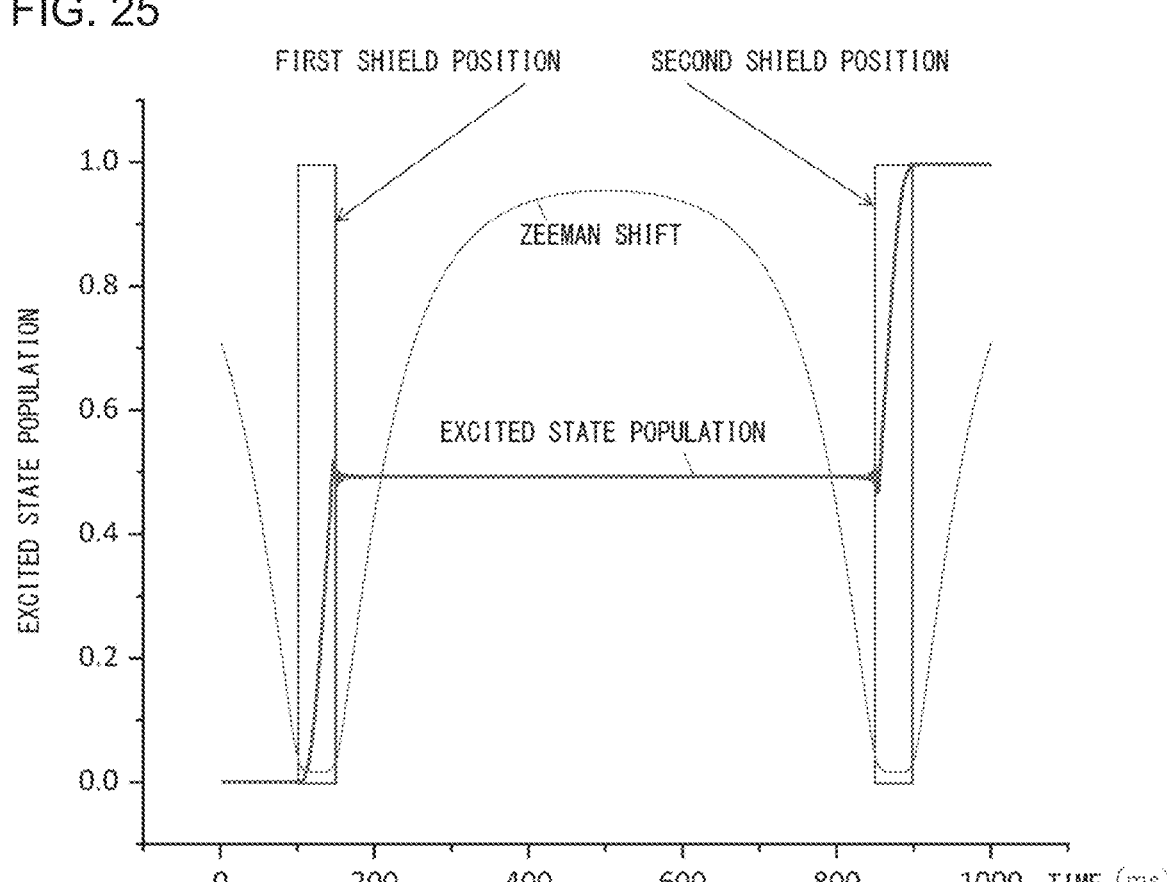
FIG. 25 shows the time variation of the population of excited states and the Zeeman shift in the configuration of FIG. 22.

FIG. 25 shows the time variation of the population of excited states of atoms and the Zeeman shift in the configuration shown in FIG. 22. As mentioned above, at the first shield position, the Zeeman shift is about 32 μT, and the resonance condition with the probe laser is satisfied, so the population of excited states rises from 0 to 50% (π/2 pulse). After exiting the first shield position, the system evolves freely with the population of excited states at 50% because it becomes non-resonant with the probe light due to the large Zeeman shift. At the second shield position, the Zeeman shift becomes about 32 μT again, and the population of excited states rises from 50% to 100% due to the π/2 pulse again.

Figure 26:
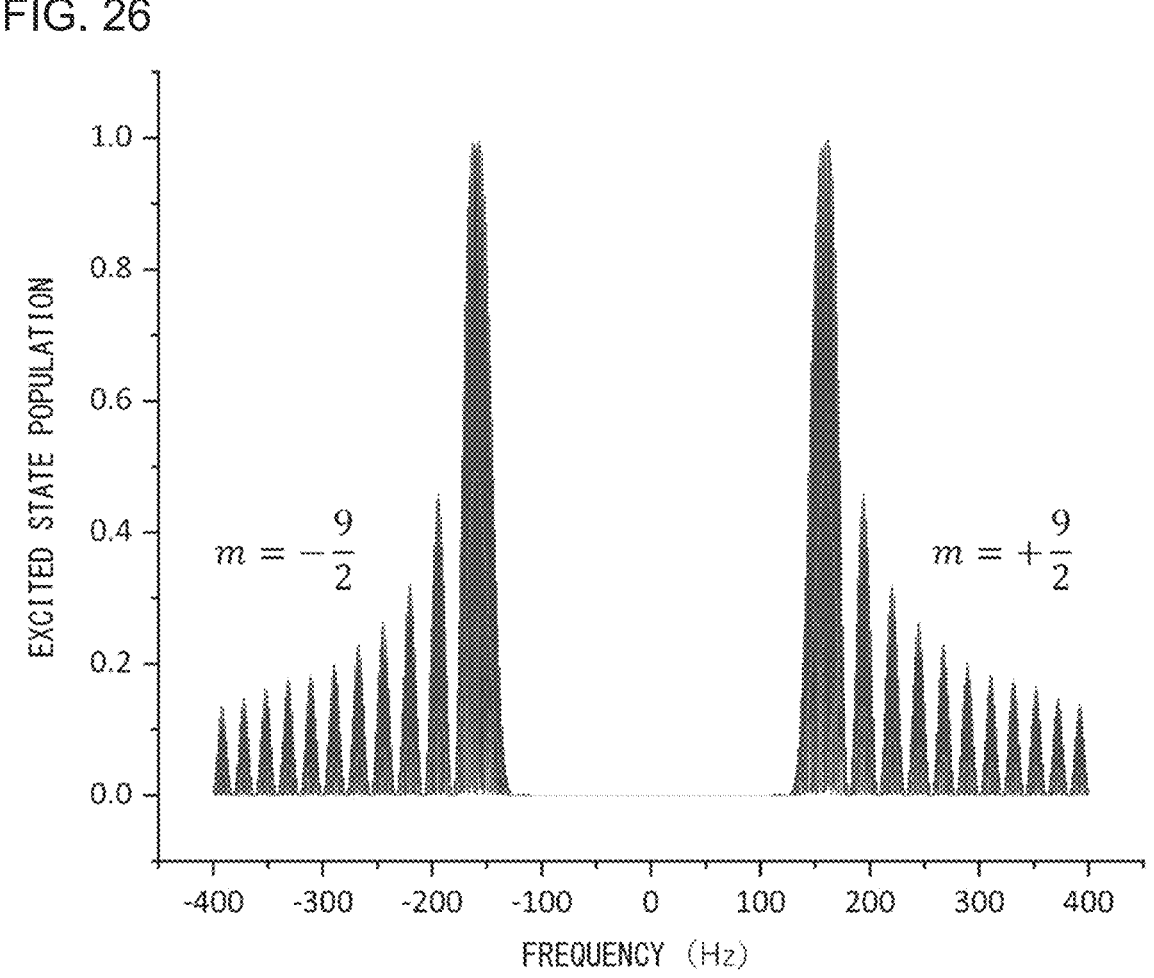
FIG. 26 shows the Ramsey spectra of $m=-\frac{9}{2}$ and $m=+\frac{9}{2}$ in the configuration of FIG. 22.

FIG. 26 shows the Ramsey spectra for m=−9/2 (left side of the figure) and m=9/2 (right side of the figure) in the configuration of FIG. 22. As shown in the figure, the spectral waveforms are almost left-right symmetry with frequency 0 at the center. Therefore, by taking the average from the observations of m=−9/2 and m=9/2, Ramsey spectroscopy can be performed to cancel the value of the first-order Zeeman shift.

Figure 27:
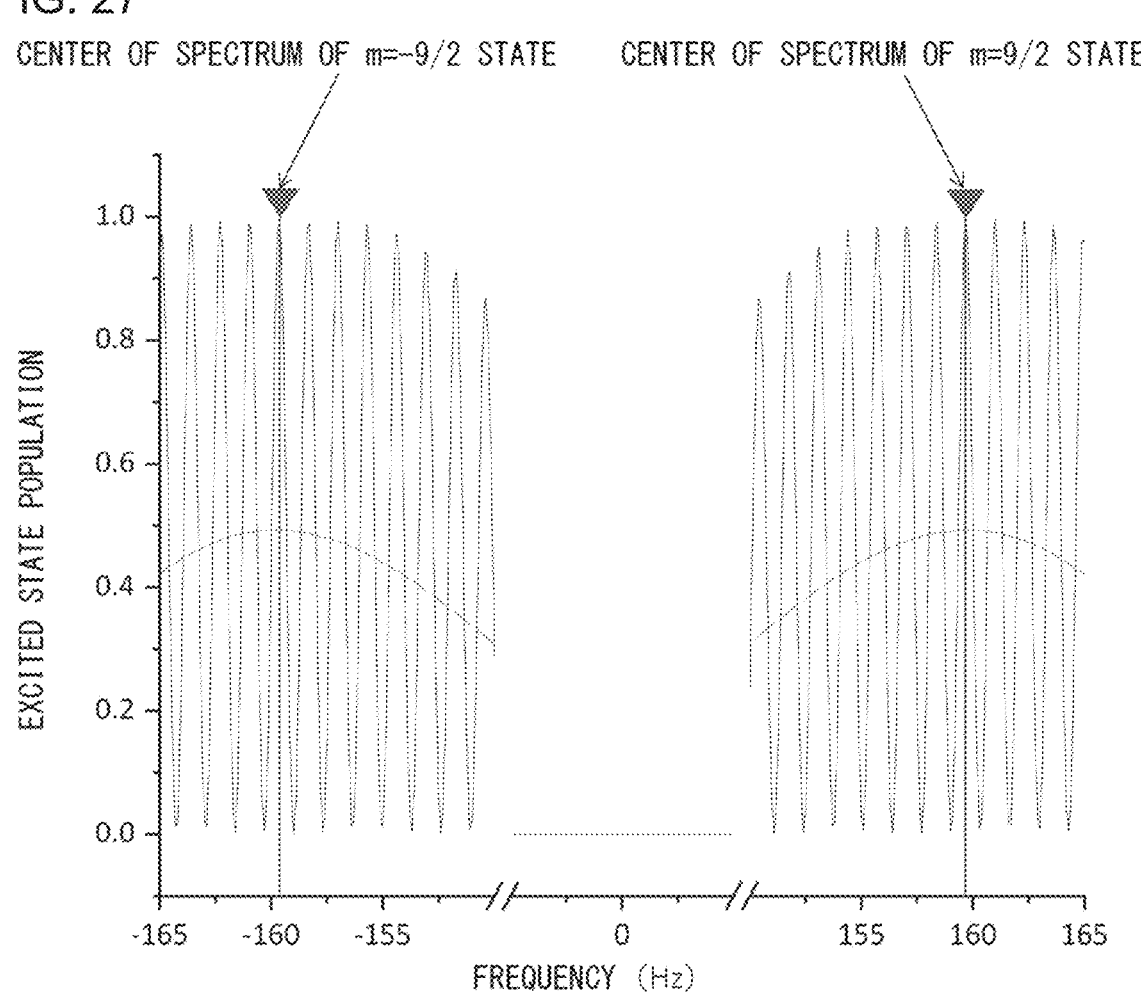
FIG. 27 is an enlarged view of FIG. 26.

FIG. 27 is an enlarged view of FIG. 26. As shown in the figure, the spectra of the −m and +m magnetic sublevels are positively and negatively symmetrically Zeeman shifted with respect to the center of the spectrum when there is no Zeeman shift, and the point where the frequency is zero can be obtained by taking the average. On the other hand, the effective magnetic field interacting with the atom can be estimated from the frequency of the difference between the spectrum of the −m magnetic sublevel and the +m magnetic sublevel. This value can be used to estimate and compensate for small second-order Zeeman shifts.

As explained above, according to the sixteenth embodiment (magnetic field shielded type), Ramsey spectroscopy, which performs π/2 pulse excitation at a magnetically shield position using an alkaline earth metal with nuclear spin, has the effect as below.

The first-order Zeeman shift can be measured and compensated by observing the spectra of positive and negative magnetic sublevel m=±I states.

This value can be used to estimate and compensate for the second-order Zeeman shift.

This eliminates the need for detailed magnetic field settings.

The second-order Zeeman shift and optical lattice light shift can be reduced to $1/1000$ compared to the magnetic field-induced embodiment.

The sixteenth embodiment is an atomic transition frequency measurement device, but the same principle can also be used to realize an atomic electronic state splitter, or an atom interferometer as follows.

Seventeenth Embodiment

The seventeenth embodiment is an electronic state splitter for atoms with nonzero total angular momentum (F≠0). This electronic state splitter for atoms comprises an atom supplier, an atom movement path, a probe laser source, a magnetic field source, and a magnetic shield. The atom supplier supplies atoms that move at a constant velocity along the atom movement path. The magnetic shield surrounds the atom movement path. The magnetic shield reduces the external magnetic field within the shield of the surrounded portion. A probe laser source provides a probe laser in the atom movement path that resonates with the Zeeman-shifted atomic transitions in the shield. This allows the atoms to be excited at the shield position.

Eighteenth Embodiment

The eighteenth embodiment is an atom interferometer. This atom interferometer comprises multiple electronic state splitters for atoms with non-zero total angular momentum (F≠0). That is, this atom interferometer comprises an atom supplier, an atom movement path, a probe laser source, a magnetic field source, a first magnetic shield and a second magnetic shield. The atom supplier supplies atoms that move at a constant velocity along the atom movement path. The first magnetic shield and the second magnetic shield surround the atom movement path. The first magnetic shield and the second magnetic shield each reduce the external magnetic field within the shield of the portion surrounded by the first magnetic shield and the second magnetic shield. A probe laser source provides a probe laser in the atom movement path that resonates with the Zeeman-shifted atomic transitions within the shield. This allows the atoms to be excited at the first shield position and the second shield position.

Note that all of the various numerical values used in the above description are for illustrative purposes only and are not intended to limit the scope of the invention.

The present invention has been described above based on the embodiments. It is understood by those skilled in the art that these embodiments are examples, that various variations are possible in the combination of their respective components and respective processing processes, and that such variations are also within the scope of the invention.

The invention claimed is:

1. An electronic state splitter for atoms, comprising:
an atom supplier;
a probe laser source; and
a magnetic field generator, wherein
the atom supplier supplies atoms moving at a constant velocity along the atom movement path, wherein the probe laser source provides in the atom movement path a probe laser that propagates on the same axis as the atom movement path in the same direction as or opposite to the motion of the atoms and wherein
the magnetic field generator generates in the atom movement path a magnetic field orthogonal to the atom movement path such that the probe laser excites a clock transition by the magnetic field by mixing a wavefunction with a dipole-allowed electronic state.

2. The electronic state splitter for atoms according to claim 1, comprising a first lattice laser source and a second lattice laser source, wherein
the first lattice laser source and the second lattice laser source supply a pair of optical lattice lasers that propagate in opposite directions each other along the atom movement path to form an optical lattice formed of standing waves,
the pair of optical lattice lasers have the frequency of each optical lattice laser shifted with respect to each other, wherein
the optical lattices are moving optical lattices that move along the atom movement path and wherein
the moving optical lattices carry the atoms along said atomic movement path.

3. The electronic state splitter for atoms according to claim 2, characterized in that each of the optical lattice lasers is set to a magic frequency that does not cause a Stark shift on the clock transition.

4. An atom interferometer comprising multiple electronic state splitters, wherein the electronic state splitters comprising:
an atom supplier;
an atom movement path;
a probe laser source;
a first magnetic field generator; and
a second magnetic field generator, wherein
the atom supplier supplies atoms moving at a constant velocity along the atom movement path, wherein
the probe laser source provides in the atom movement path a probe laser that propagates on the same axis as the atom movement path in the same direction as or opposite to the motion of the atoms and wherein
the first magnetic field generator and the second magnetic field generator generate in the atom movement path a magnetic field orthogonal to the atom movement path to cause mixing of the wavefunction with the dipole-allowed electronic state, thereby enabling excitation of the clock transitions by the probe laser.

5. The atom interferometer according to claim 4, characterized in that the first magnetic field generator and the second magnetic field generator are spaced apart by a distance corresponding to the interaction length between the atom and the probe laser.

6. The atom interferometer according to claim 5, comprising a detection laser source providing a detection laser for projective measurement of the electronic state of the atom after electronic state operation by the electronic state splitter, wherein the first magnetic field generator and the second magnetic field generator each causes excitation with a π/2 pulse area of on the atom by combining the magnetic field and the probe laser to achieve Ramsey spectroscopy.

7. An atomic transition frequency measurement device, comprising:
an atom supplier;
an atom movement path;
a probe laser source;
a first magnetic field generator;

a second magnetic field generator;

a detection laser source; and a detector, wherein the atom supplier supplies atoms moving at a constant velocity along the atom movement path, wherein the probe laser source provides in the atom movement path a probe laser that propagates on the same axis as the atom movement path in the same direction as or opposite to the motion of the atoms, wherein the first magnetic field generator and the second magnetic field generator generate in the atom movement path a magnetic field orthogonal to the atom movement path to cause mixing of the wavefunction of the clock upper state with the dipole-allowed electronic state, thereby enabling excitation of the clock transitions by the probe laser, wherein the first magnetic field generator and the second magnetic field generator each causes excitation with a $\pi/2$ pulse area of on the atom by combining the magnetic field and the probe laser to allow Ramsey spectroscopy, wherein the first magnetic field generator and the second magnetic field generator are spaced apart by a distance corresponding to the interaction length between the atom and the probe laser, wherein the detection laser source provides a detection laser for projective measurement of the electronic state of the atom after being irradiated with a pulse and wherein the detector measures a signal proportional to the population of the electronic states of the atom.

8. An atomic oscillator comprising an electronic state splitter for atoms according to claim 1.

9. An optical lattice clock comprising an electronic state splitter for atoms according to claim 1.

10. A quantum computer comprising an electronic state splitter for atoms according to claim 1.

11. A method for generating a superposition of electronic states of atoms using an electronic state splitter for atoms, the electronic state splitter for atoms comprising an atom supplier, an atom movement path, a probe laser source and a magnetic field generator, comprising:

supplying atoms moving at a constant velocity along the atom movement path using the atom supplier;

providing in the atom movement path a probe laser that propagates on the same axis as the atom movement path in the same direction as or opposite to the motion of the atoms using the probe laser source; and generating in the atom movement path a magnetic field orthogonal to the atom movement path to cause mixing of the wavefunction of the clock upper state with the dipole-allowed electronic state, thereby enabling excitation of the clock transitions by the probe laser using the magnetic field generator.

12. An electronic state splitter for atoms, comprising:

an atom supplier;

an atom movement path;

a probe laser source;

a magnetic field source; and a magnetic shield, wherein the atom supplier supplies atoms moving at a constant velocity along the atom movement path, wherein the magnetic shield surrounds the atom movement path and reduce the magnetic field generated by the magnetic field source at a shield position of the surrounded portion and wherein the probe laser source excites the atom at the shield position by providing in the atom movement path a probe laser that resonates with the Zeeman-shifted atomic transitions at the shield position.

13. An atom interferometer comprising multiple electronic state splitters, wherein the electronic state splitters comprising:

an atom supplier;

an atom movement path;

a probe laser source;

a magnetic field source;

a first magnetic shield; and a second magnetic shield, wherein the atom supplier supplies atoms moving at a constant velocity along the atom movement path, wherein the first magnetic shield and the second magnetic shield surround the atom movement path and reduce the magnetic field generated by the magnetic field source at a first shield position and a second shield position of the surrounded portion respectively and wherein the probe laser source excites the atom at the shield position by providing in the atom movement path a probe laser that resonates with the Zeeman-shifted atomic transitions at the first shield position and the second shield position.

14. An atomic transition frequency measurement device, comprising:

an atom supplier;

an atom movement path;

a probe laser source;

a magnetic field source;

a first magnetic shield;

a second magnetic shield;

a detection laser source; and a detector, wherein the atom supplier supplies atoms moving at a constant velocity along the atom movement path, wherein the first magnetic shield and the second magnetic shield surround the atom movement path and reduce the magnetic field generated by the magnetic field source at a first shield position and a second shield position of the surrounded portion respectively, wherein the probe laser source excites the atom at the shield position by providing in the atom movement path a probe laser that resonates with the Zeeman-shifted atomic transitions at the first shield position and the second shield position, wherein the first magnetic shield and the second magnetic shield each causes excitation with a $\pi/2$ pulse area of on the atom by combining the magnetic field and the probe laser to achieve Ramsey spectroscopy, wherein the detection laser source provides a detection laser for projective measurement of the electronic state of the atom after being irradiated with a pulse and wherein the detector measures a signal proportional to the population of the electronic states of the atom.

* * * * *